United States Patent [19]

Shannon

[11] Patent Number: 5,457,772
[45] Date of Patent: Oct. 10, 1995

[54] METHOD TO CONVERT BITMAPS TO MONOCHROME DATA

[75] Inventor: Terrence M. Shannon, Boise, Id.

[73] Assignee: Hewlett-Packard Company, Palo Alto, Calif.

[21] Appl. No.: 960,761

[22] Filed: Oct. 13, 1992

[51] Int. Cl.⁶ .................................. H04N 1/40
[52] U.S. Cl. ................................... 395/109
[58] Field of Search ............... 395/131, 109; 345/147, 152, 153, 154, 155, 199; 346/157; 358/455, 456, 457, 458, 459, 460, 461, 529, 534, 535, 536, 598

[56] References Cited

U.S. PATENT DOCUMENTS

| | | | |
|---|---|---|---|
| 4,977,398 | 12/1990 | Pleva et al. | 340/793 |
| 5,153,651 | 10/1992 | Kurotaka | 355/271 |
| 5,245,327 | 9/1993 | Pleva et al. | 345/147 |
| 5,307,135 | 4/1994 | Amakawa et al. | 355/326 |
| 5,323,247 | 6/1994 | Parker et al. | 358/456 |

FOREIGN PATENT DOCUMENTS

| | | | |
|---|---|---|---|
| 0158902 | 3/1985 | European Pat. Off. | G09G 1/28 |
| 0446008 | 3/1991 | European Pat. Off. | H04N 1/40 |
| 0473433 | 8/1991 | European Pat. Off. | H04N 1/40 |
| 0469882 | 7/1992 | European Pat. Off. | H04N 1/40 |

*Primary Examiner*—Mark R. Powell
*Assistant Examiner*—Gabriel Garcia

[57] ABSTRACT

A peripheral unit converts source color image data to a rasterized monochrome bit map and includes a random access memory, a storage memory containing a gray scale conversion table, dithering matrices, procedures for determining destination image dithering tiling locations, scaling conversion procedures and sub routines for establishing a gray scale value array index to a bit mask array. The peripheral unit performs a method of converting color source image data to a rasterized compressed monochrome bit map which involves a conversion cycle for converting source pixels to gray scale value and output position bits within the two arrays. Testing is performed to determine all of the source pixels converted to the same gray scale value, and if so, a read ahead cycle commences, reading ahead in the source pixel row for as long as the unconverted source image color data bytes are the same as for those converted in the conversion cycle. The converted output position bits of the converted source pixels are dithered, and an attempt is made to generate a compressed data repeated run entry with a default to a literal run entry based upon dithering of only the converted source pixel output position bits and a count of repeating source pixels.

18 Claims, 6 Drawing Sheets

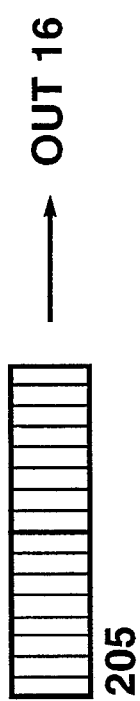
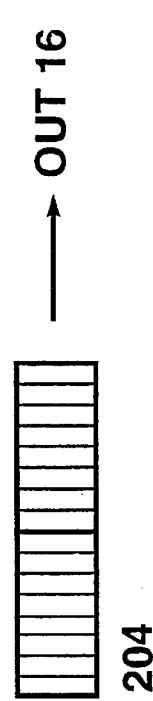
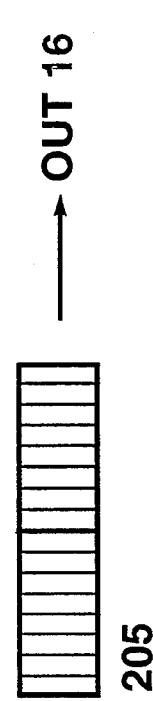
FIG. 3
FIG. 4

METHOD TO CONVERT BITMAPS TO MONOCHROME DATA

APPENDIX

An appendix of computer program code accompanies this Application, and is a part hereof.

BACKGROUND OF THE INVENTION

1. Technical Field

This invention relates to a process for converting color bit map data to compressed monochrome data, and more particularly to convert color bit map data to resolution scaled monochrome data in Printer Control Language Method Two compressed data without explicit processing of all repeating source color data.

2. Background Art

Prior art processes for converting source color images to monochrome rasterized bit maps typically require examination of each pixel of the source bit map and conversion of the color information for each pixel to a gray scale value. After conversion, the correct dithering matrix is retrieved and scaled output pixels are generated. This is a slow, cumbersome process involving a large number of computations. This is especially so when converting visual color image data to high resolution raster bit maps, such as those utilized by laser printers having print engines capable of 300 or even 600 dots per inch. The rasterized bit map for monochrome image at 300 dots per inch resolution requires approximately a megabyte of raster memory for each letter-size page. At 600 dots per inch, 3.8 megabytes of memory are required. If the conversion process converts each individual source pixel, one at a time, and dithers each scaled group of output pixels resulting from each source pixel, processing 3.8 megabytes of rasterized bits of output image results in 30 million conversion computations and 30 million dithering operations which can take a considerable amount of time.

Laser printers typically include an on board or internal memory capable of receiving rasterized data bit map information from a host processor. This bit map is used to construct page intermediate strips of rasterized data. The page intermediate strips of rasterized data re delivered to the laser print engine which operates at a constant speed. If new rasterized data is not available at a rate that keeps up with the engine's operation, a print "overrun" occurs and the page is not printable. To prevent this from occurring, page intermediate formatting must occur at a high enough rate to keep up with the print engine. This can only be accomplished if the host processor is sending formatted data at a high enough rate of speed, or the printer contains sufficient internal memory to hold the entire destination image bit map which has been delivered to it at perhaps a slower rate of speed from the host processor.

To maintain the cost of laser printers at a low level, substantial efforts have been directed to reducing the amount of required, on board, raster memory, such that it is not possible to hold a complete rasterized bit map of an image. In such cases, if the conversion, dithering and rasterization execution time, either in the random access memory (RAM) of the printer, or the host processor, is greater than the time within which page intermediate strips must be constructed for delivery to the print engine, print overruns will occur.

Execution time for prior art conversion procedures is oftentimes too slow to keep up with the construction times needed for the construction of page intermediate strips for delivery to the print engine. As a result, a number of data conversion and compression techniques are employed, usually executed in the host processor, prior to transmission of data to the printer memory to increase the rate of data transfer from the host processor to the on board memory, such that page intermediate construction can commence during the transfer while at the same time minimizing the amount of required internal printer RAM for raster memory. One of the most common compression methods is known as Printer Control Language (PCL) Method Two compression. PCL is a trademark of the assignee of this Application, Hewlett-Packard Co. PCL Method Two compression compares each byte of data to be sent, testing for whether it is "same" or "different" from a referenced byte read. If it is "same", Method Two continues to read ahead in a rasterized row of data until the test indicates either "end of line" or "different". From this information is constructed a two byte PCL compressed run, wherein the first byte indicates the number of times that the second byte is to be repeated in the rasterized row. In the event that the next byte read tests different from the previous byte read, then a literal run data string is constructed, wherein the first byte of the literal run indicates that the following bytes are to be printed in proper sequence. Method Two compression is an effective compression technique which is particularly useful for images which include numerous strings of repeated data.

Thus, in the prior art, conversion of the source color image to a rasterized bit map monochrome image has usually been completed and stored in the host processor RAM, and the compression procedure conducted prior to transmission of the bit map image data to the on-board RAM of the printer.

What is needed is a process which speeds up the conversion process by eliminating the need to convert each individual pixel's color data information to a gray scale value where there are strings of repeating color data. Also, to increase the speed of execution time, what is needed is a process by which the requirement to dither the scaled output pixels derived from the conversion of repeating source pixels is eliminated, particularly when upscaling to a higher resolution image than the original source image.

Accordingly, it is an object of this invention to provide a process by which strings of repeating source pixels need not all be converted to gray scale values, and wherein all of the scaled output pixels resulting from the scaling of the source pixels need not all be individually dithered to produce a complete rasterized bit map.

It is another object of this invention to provide a process by which the source image data can be converted directly into Printer Control Language Method Two compressed data, thus eliminating the need for processing the source image into a complete monochrome rasterized bit map prior to compression.

DISCLOSURE OF INVENTION

A peripheral unit is used to convert color source image data to a rasterized, Printer Control Language Method Two compressed, monochrome bit map and includes a random access memory, a processor and a control memory that holds a plurality of procedures necessary to convert the color source code image to the rasterized, Printer Control Language Method Two compressed, monochrome bit map, including a storage memory containing a gray scale conversion table, dithering matrices, procedures for determining destination image dither tiling locations, scaling conversion calculations, PCL Method Two conversion code, and sub routines for establishing two arrays, a gray scale value array, and a bit mask array, each containing a number of elements equal to the dither pattern width of the output image dither tiles.

The peripheral unit is used in conjunction with a three part conversion process, including an initial conversion cycle, a read-ahead cycle, and a compressed data dithering cycle.

The process begins with the initial conversion cycle, wherein color data information for source pixels are converted to gray scale values which are entered in elements of the gray scale value array. Appropriately scaled output position bits are then entered into corresponding bit mask array elements. Conversion of source pixels and entry of output position bits into the same or additional bit mask array elements continues until a counter determines that there are sufficient output position bits to fill a dither pattern tile width or row within the output image. The first element of the bit mask array is then tested to determine whether it contains all of the output position bits, which if it does, it indicates that repeating color data is present.

If the test indicates repeating color data in the source image, then the read ahead cycle is initiated, wherein the unconverted color data information for additional source pixels is read and directly compared to the unconverted original color data for the already converted source pixels and continues until either the end of the source row is reached, or until source color data of different value is encountered. Upon reading ahead to the end of the row, or encountering a source pixel of different color data value, the read ahead cycle ends and the dithering cycle begins.

The read ahead cycle is skipped if the first bit mask array element test indicates that not all output position bits are located within the first bit mask array element, and the process proceeds directly with the dithering cycle.

The dithering cycle begins with selection of the appropriate dithering matrix for the first element of the gray scale value array. The selected dithering matrix is rotated or repositioned so that the first bit in the dithering matrix corresponds in both X and Y position, to the actual X an Y position within the destination image dithering tile for the first output position bit to be dithered. Then, the entire first element of the bit mask array is ANDed to the rotated dither matrix to generate output bits. Each bit mask array element corresponds in size to the output image dithering tile width and, for purposes of data compression is divisible, in the X axis, by eight so as to facilitate direct data compression.

In the event repeating data has been encountered, the dithering process calculates the number of scaled output bits in the repeating string, attempts to compress the dithered output signal from the ANDing of the first bit mask array element to the dithering matrix to a single byte and, if successful, generates a PCL Method Two repeating run compressed data signal for transmission to an output buffer. In the event that a compressed repeating run string cannot be generated, a literal run data signal is generated and transmitted to the output buffer. In a literal run data signal the data bytes are not PCL Method Two compressed. Rather, the data bytes are printed in proper sequence.

In the event that reading ahead did not occur, essentially the same process is used, ANDing successive bit mask array elements to the appropriate, rotated dithering matrices and ORing the outputs together to form an output signal.

BRIEF DESCRIPTION OF THE DRAWINGS

FIG. 3 illustrates the conversion process employed in accordance with the procedures of FIG. 2.

FIG. 4 illustrates the conversion process employed in accordance with the procedures of FIG. 2.

BEST MODE FOR CARRYING OUT INVENTION

Hereafter, the invention will be described in the context of converting color video image data to PCL Method Two compressed data for transmission to a laser printer. However, it should be understood that any source color data and other devices, such as plotters, facsimile units, etc., can also make use of the procedures embodied within this invention.

Attached as an appendix is the actual computer code used to practice the invention described herein. The teachings of the appended microfiche are hereby incorporated by reference.

Figure 1:
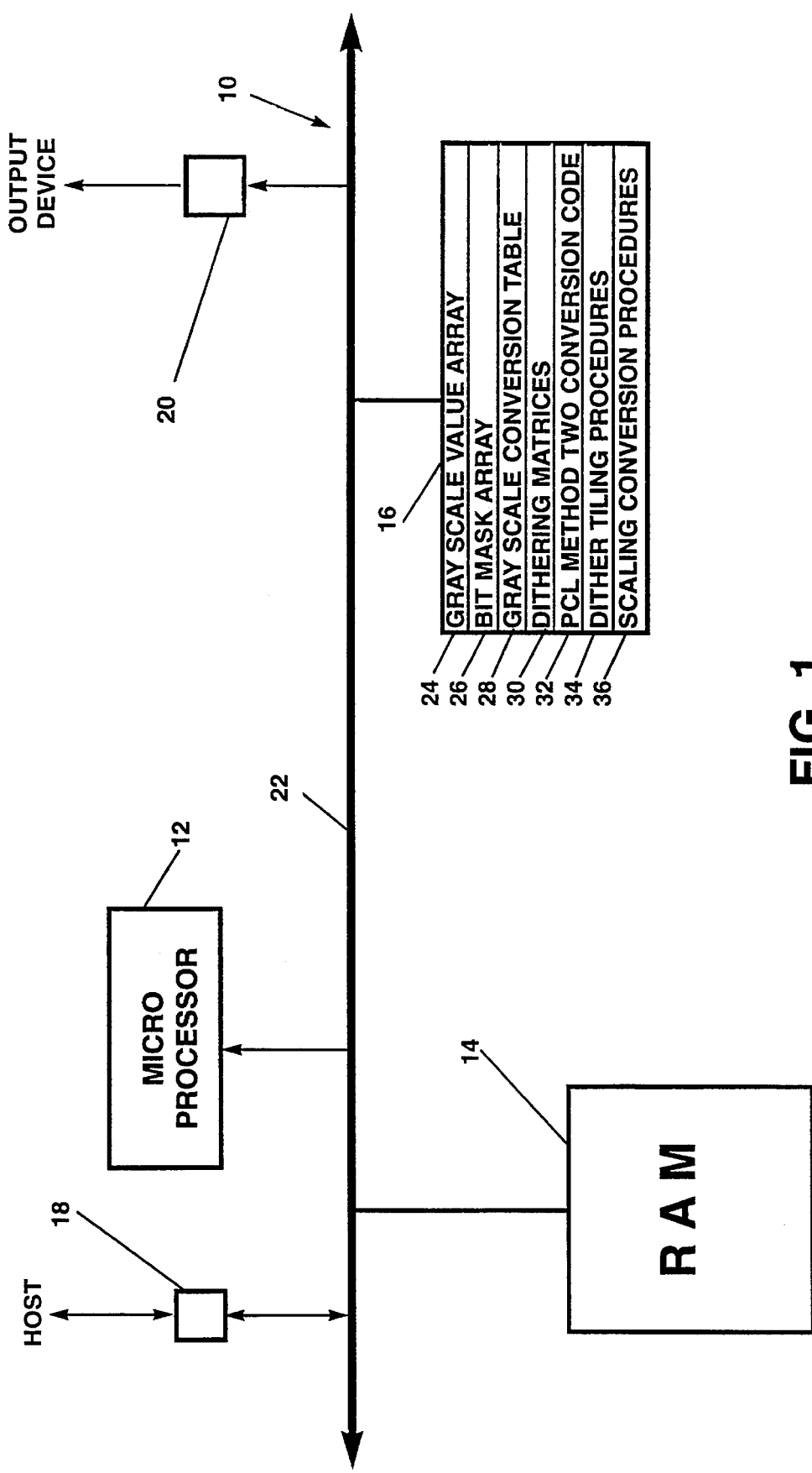
FIG. 1 is a high level block diagram of a peripheral unit that is adapted to carry out the invention.
Figure 2A:
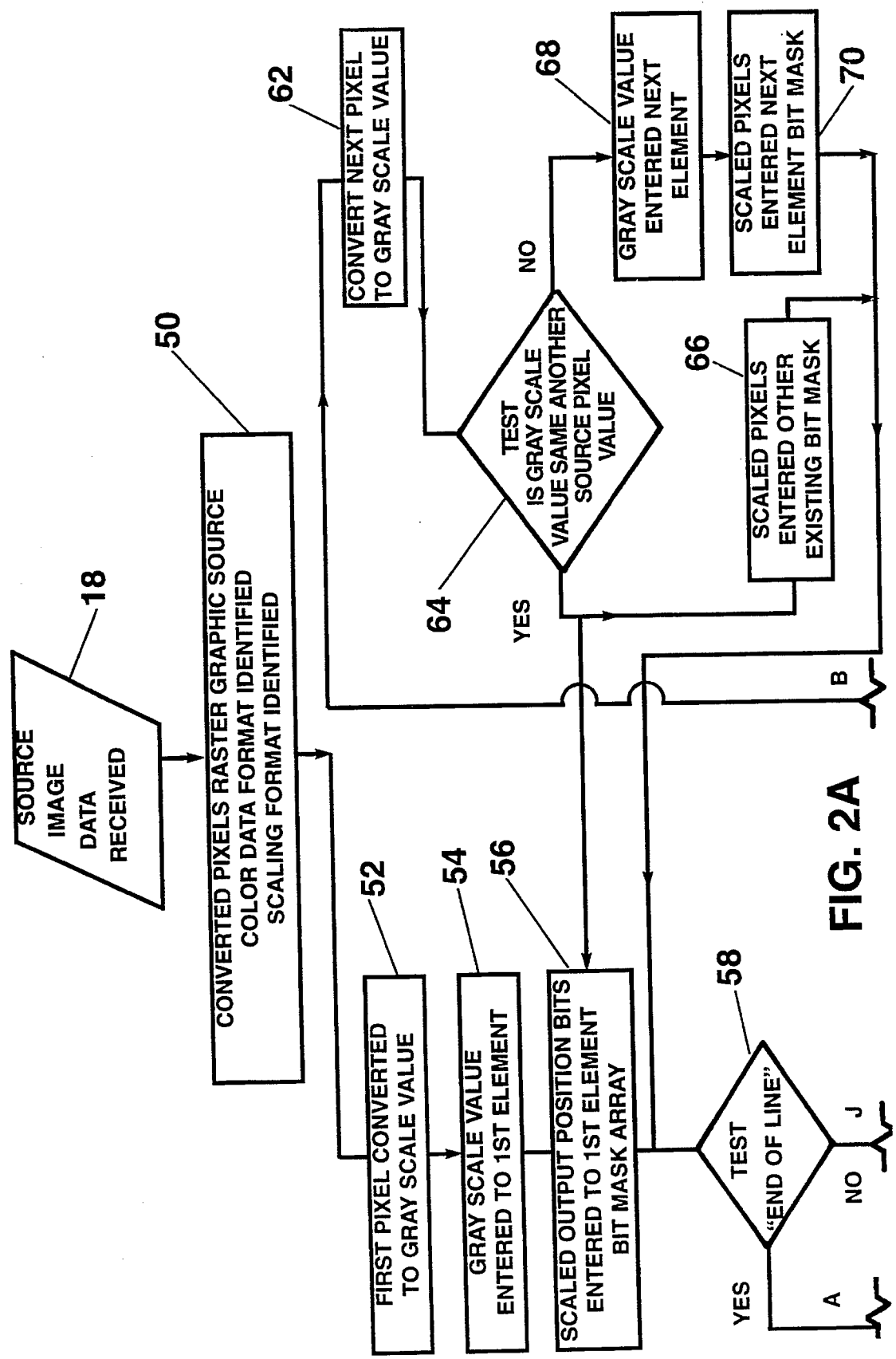
FIG. 2 is a global flow diagram illustrating the overall procedure of the invention hereof.
Figure 2B:
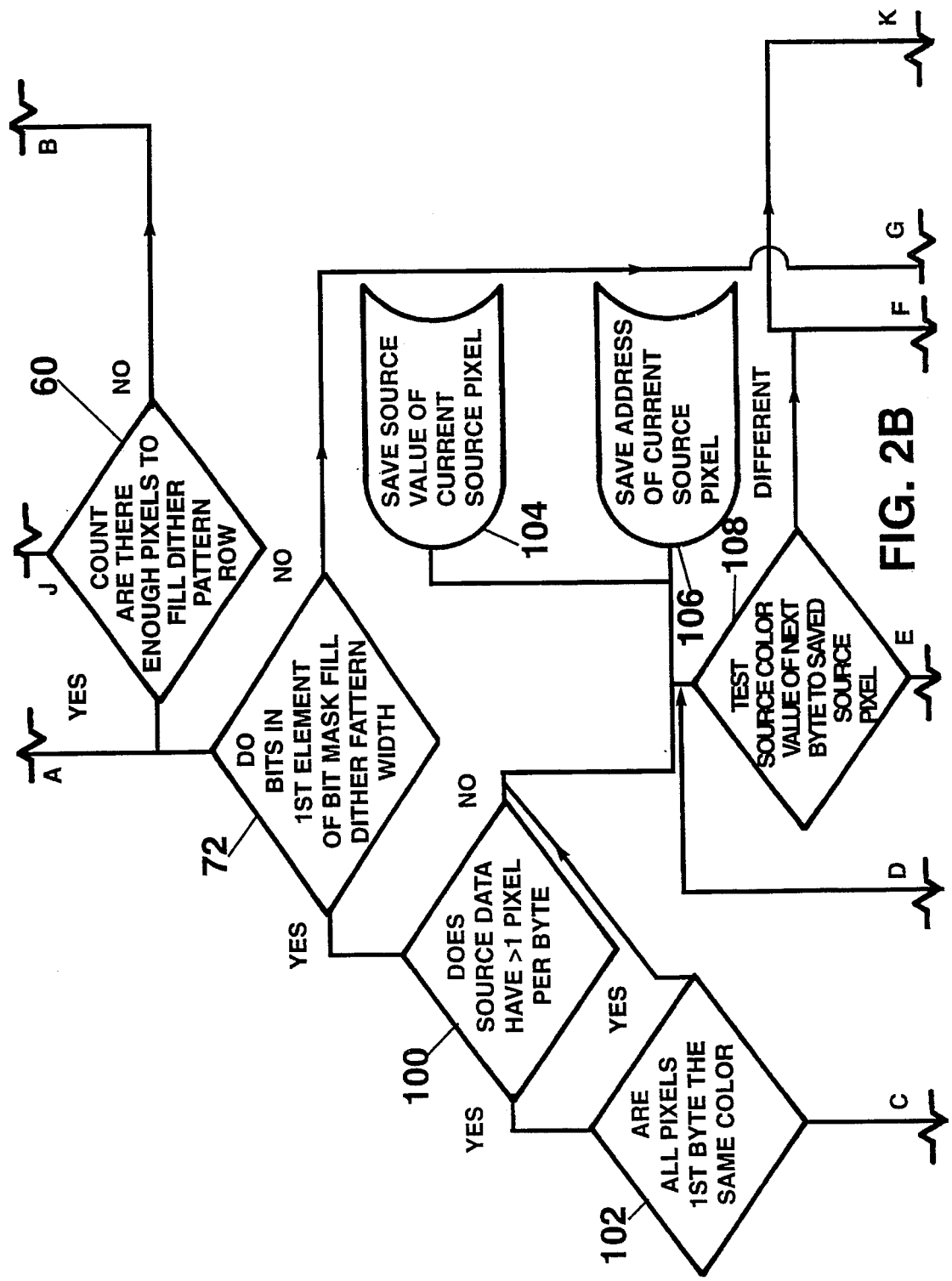
Figure 2C:
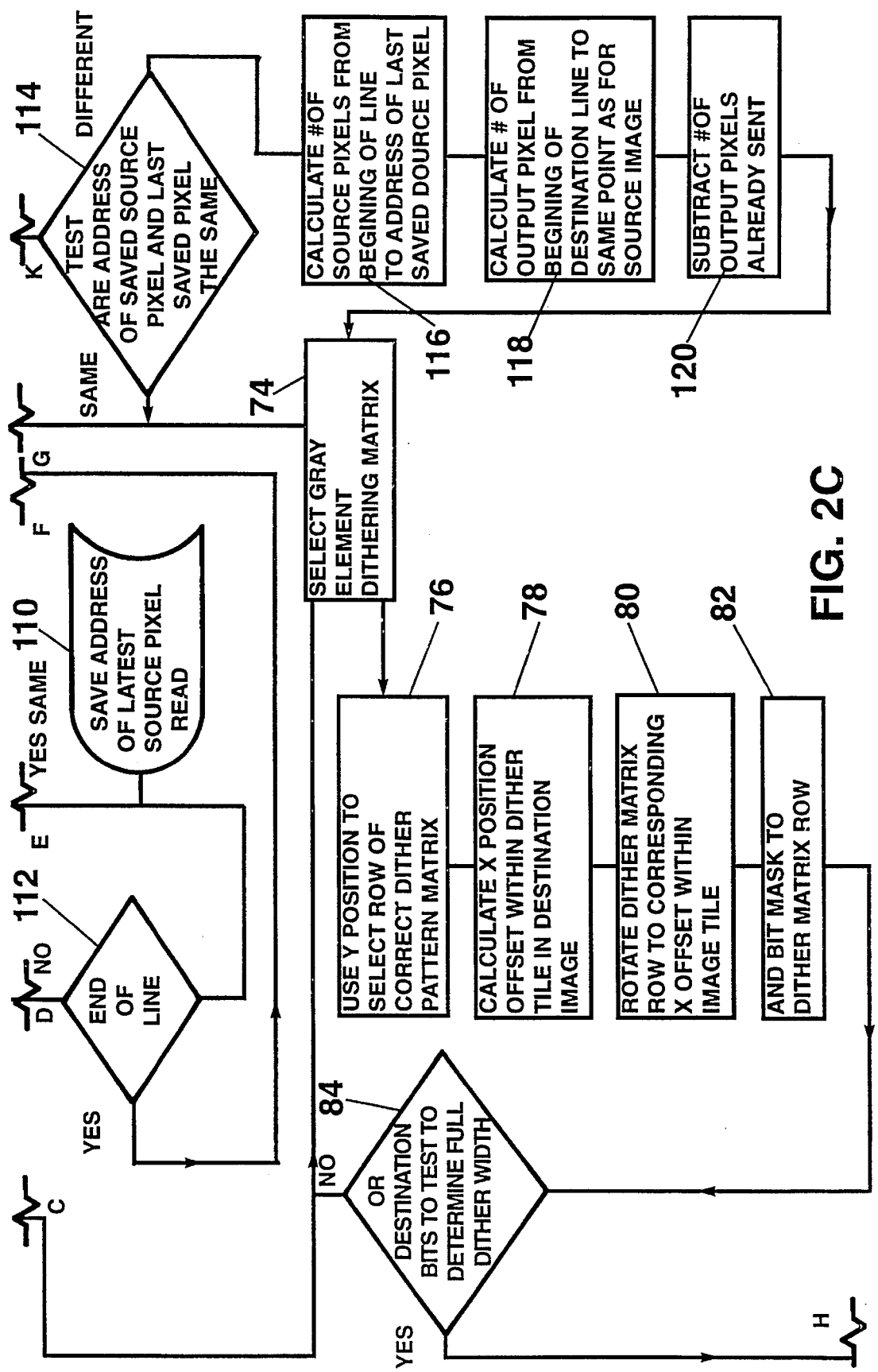
Figure 2D:
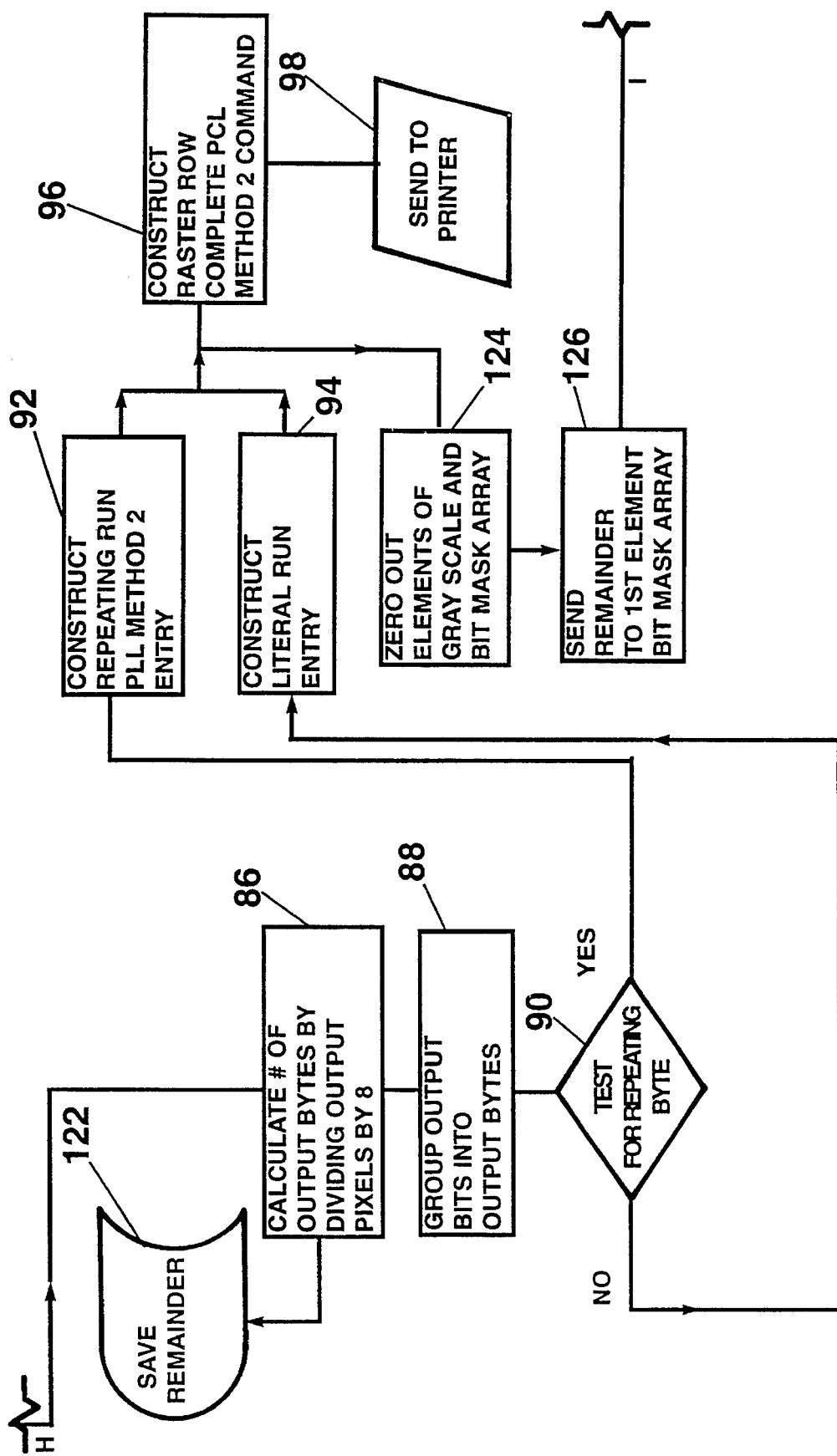

In FIG. 1, peripheral unit 10 includes processor 12, input port 18, random access memory (RAM) 14, storage memory 16, output port 20, all connected by bus 22 and contains all of the procedures necessary to assure the conversion of color image data bit maps to compress monochrome bit maps for devices that use TIFF or pack bit data compression. In this example, the printer connected to output port 20 accepts Printer Control Language (PCL) Method Two compressed data format.

Image data from the host processor is received via input port 18 and read into RAM 14. The image data may take one of several forms. It may include sub-images or pixels wherein the descriptors are contiguous with each sub-image and are processed along with each sub-image or wherein the sub-image or pixel descriptors are received separately from (but linked to) the actual sub-image data. In both versions, when peripheral unit 10 receives image data, it is parsed and commands and data are processed to derive raster graphics data that includes source image color data and location descriptors for each pixel of the source image.

Storage memory 16 contains the sub routines that carry out the conversion procedure which include gray scale conversion table 28, dithering matrices 30, PCL Method Two conversion code 32, procedures for determining destination dither tiling locations 34, scaling conversion procedures 36 and two arrays, gray scale value array 24 and bit mask array 26.

Establishing Gray Scale Value and Bit Mask Arrays in RAM

The two arrays, gray scale value array 24 and bit mask array 26, are established in RAM. Each contain a number of elements equal to the dither pattern width of the output image dither tiles. Each are, in the preferred embodiment, evenly divisible by eight to facilitate PCL Method Two compression.

In the preferred embodiment, the gray scale monochrome data is contained in a single eight bit byte, thus providing an availability of 254 shades of gray between pure white, represented by the binary number for 255, and solid black, represented by the binary number for .0. In all cases, regardless of whether the color data is contained in a single byte format, or where the color data format is four bits per pixel or twenty four bits per pixel, the source color data must normalized during conversion to an appropriate monochrome gray shade, as for example the sixteen available colors in four bits per pixel color data format are spread across the spectrum of the 256 available shades of monochrome data.

The bit mask array 26 is intended to hold information indicating the relative positions of the output pixels that will be generated for each associated gray value. Like the gray scale value array, it contains the number of elements equal to the dither pattern matrix width and, in the preferred embodiment is evenly divisible by eight for purposes of eventual data compression. Each element of the bit mask array contains a bit block of sufficient size to hold the number of output position bits equal to the dither pattern tile width of the output image, so that in the event all of the output pixels are of the same gray scale value, they can be contained within a single bit mask array element. The elements of gray scale value array 24 and bit mask array 26 correspond to each other by their element indexes.

For purposes of example, and for demonstrating the preferred embodiment, the following parameters will be used: the source color image is a video image with rasterized pixels at a resolution of seventy four per inch; the source color data for each pixel is contained in one eight bit byte which corresponds to 256 available colors including white and black; the dithering pattern matrices for the output image tiles are sixteen pixels by sixteen pixels; the device to which the output pixel data will be sent is a laser printer having a laser engine with a resolution of 600 dots per inch (DPI) and is compatible with Printer Control Language Method Two compression procedures; and finally, the source image, as is usually the case, contains a significant amount of repeating data.

Turning to FIG. 2, a flow diagram, illustrates the actions taken in the peripheral unit to convert the pixels of the source color image to a PCL Method Two compressed data monochrome bit map. In the first step, as is shown in box 50, source image data is received through input port 18 and is converted to a raster graphic bit map, the source color data format is identified, and the scaling format to be used is calculated using scaling conversion procedures 36. With regard to the scaling format, the source format in this example is seventy four pixels per inch, and the output format or resolution is 600 DPI, which will result in scaling ratio of approximately 8.1 output pixels in both the horizontal, or X direction, and the vertical Y direction, for each input pixel, thus defining X and Y scaling factors equal to 8.1 each. Periodic rounded scaling is thus required so as to provide an output of 600 output pixels for each seventy four input pixels.

Since the number of destination or output pixels to be generated by each source pixel is proportional to the ratio of the number of output pixels in one raster row divided by the number of source pixels in the corresponding source row, it is essential for accurate conversion that extra output pixels be added to the image in identical locations within each row. For that reason all scaling calculations and the addition of extra output pixels begins anew at the beginning of each row, and is measured, for each row, from the beginning of each row of the output image.

It should also be pointed out that in addition to scaling because of varying resolutions, scaling can also occur by reason of image sizing, both upsizing and downsizing. In any event, the principles embodied within this method are the same.

Converting the Color Data Information of a Source Pixel into a Corresponding Gray Scale Value As shown in FIG. 2, once the color data format has been identified, and in this example it is an eight bit byte of color information, and the scaling format identified, the first byte of source color data information is converted to a monochrome gray scale value as determined from gray scale conversion table 28 as shown in FIG. 1, and as shown in FIG. 2 as box 52.

Storing Each Different Gray Scale Value Obtained from Conversion of Said Color Data Information in a Separate Element of the Gray Scale Value Array This gray scale value is then entered, in the first element of the gray scale value array, as representationally shown in FIG. 3 as element 200 and as box 54 in FIG. 2.

Generating and Storing Scaled Output Division Bits to the Bit Mask Array Element Indexed to the Gray Scale Array Element Next, scaled output position bits, which, in this example, for the first source pixel, would be eight output position bits, are generated and entered, one at a time, in the first bit mask array element 201 of FIG. 3 in their proper locations within the sixteen bits of bit mask array element 201, and as shown in box 56 of FIG. 2. As shown in FIG. 2, as each output position bit is entered in any bit mask array element, it is tested at decision box 58 to determine whether the end of the raster row of the output image has been reached. In addition, as each output position bit is entered into a bit mask array element it is counted in decision box 60 to determine when the bit mask array contains enough output position bits to exactly fill one dither pattern tile width of the output image, which in this example is sixteen bits wide.

Since decision box 60, at this point in time, only counts eight output position bits in the first bit mask array element, the color data byte for the next source pixel is retrieved and converted to its gray scale value as shown in box 62. It is then tested at decision box 64 to determine whether or not it is equal to the gray scale value of the first source pixel in box 54. If the test results indicate that the gray scale value is of a different value from that determined in box 52 and stored in box 54 for the fist source pixel, then the second gray scale value is then entered into second element 202 of the gray scale value array as shown in FIG. 3 and as shown in box 68 of FIG. 2, and the appropriate number of scaled output position bits are entered into the corresponding second element 203 of bit mask array 26, as shown in FIG. 3, and box 70 of FIG. 2.

The number of output position bits representing eventual output pixels are continuously counted in decision box 60 as they are entered into any element of bit mask array 26. Also, as the color data for each source pixel is converted to a gray scale value, that value is tested in decision box 64 to determine whether that gray scale value has been encountered before in the current conversion cycle. If it has, then the gray scale value is not re-entered into the next element of the gray scale value array, but instead the associated output position bits for the converted source pixel are entered into the proper relative locations within the bit mask array element already associated with the previously encountered gray scale value as shown in box 66.

The steps of converting color data information into a corresponding gray scale value, generating an appropriate number of output position bits, storing each different gray scale value in a separate element of the gray scale value array, and storing the output position bits in the bit mask array are repeated until the number of output position bits entered equals the width of a dither pattern tile for the monochrome output image.

At this point in time, the process of conversion of source color data into gray scale value stops. It stops even if the scaling process were to call for additional output position bits for the particular source pixel being converted. In the event scaling results in unused output position bits for the last source pixel converted, and no reading ahead occurs, this source pixel is reused, for the remaining scaled output position bits, as the first new source pixel converted when the conversion process begins anew in the conversion cycle.

If the scaling ratio were lower, for example four output position bits per source pixel, conversion of source pixels would continue until a full dither pattern tile width of output position bits had been generated, with each new gray scale value encountered being entered into a new gray scale value array element and scaled output position bits being entered into the corresponding element of the bit mask array.

If scaling were not to occur, that is to say that the ratio of input to output pixels were to be one to one, and each source pixel were of a different color, and converted to a different gray scale, then sixteen elements would be needed in both gray scale value array 24 and bit mask array 26. For this reason, each array contains a sufficient number of elements to match the output dither pattern tile width. However, it is unlikely that all elements would be used in any given conversion and fill of the arrays.

Similarly, each bit mask array element has a bit block large enough to hold a full dither pattern tile width, since it is much more likely that only one or two gray scale values will be encountered in any given conversion cycle.

Testing to Determine Whether All of the Output Position Bits are Stored in One Mask Array Element Once the bit mask array elements contain the correct number of output position bits, as shown in FIG. 3, the first bit mask array element 201 is tested to determine whether all of its sixteen bits are on, indicating that all of the output position bits are stored in that one bit mask array element, as shown in decision box 72 of FIG. 2. If they were all on, which in this first example of the conversion cycle they are not, it would indicate that the first two source pixels examined in this example were of the same color. Since not all bits in element 201 are on, the conversion process proceeds to dithering of the stored output position bits for eventual transmission to the output buffer of a PCL Method Two compressed data literal run entry.

Sequentially Dithering the Output Position Bits Stored in Each Element of the Bit Mask Array Holding Stored Output Position Bits to Generate Bits of Output Data The dithering process begins with the selection of the correct dither pattern matrix for the first element 200 from the gray scale value array as shown in box 74. Once the correct dither pattern matrix has been selected, the Y position within the output image dither pattern tile for the particular output position bits to be dithered is calculated as shown in box 76 so that the same Y position row within the dither pattern matrix can be selected. In a like manner, as shown in box 78, the X position, or the bit offset within the destination bit map dithering tile for the first output position bit to be dithered is calculated and the selected Y row of the dithering pattern matrix is rotated, in box 80, to match the X position of the first output position bit from dithering matrix to the X position of the first output bit in the destination dithering tile.

Thereafter, as shown in box 82, the output position bits stored in each element of the it mask array that correspond to the particular gray scale value element, which in this example is but mask array element 201 is ANDed to the rotated dither pattern matrix row to generate what eventually will become output pixels.

The dithering process is sequentially repeated for each gray scale value array element and associated output position bits as described below.

Assembling an Output Signal From the Bits of Output Data

Bits mask array element 201 is then ORed into a test array to determine whether all sixteen output position bits are on as shown in decision box 84. If not, the process is repeated for the next gray scale value array element 202 for the next gray scale value and associated output position bits. It would continue sequentially with the next elements of the gray scale value array and bit mask array until all bits in the test array are on, thus generating an assemblage of output data bits.

The assemblage of output data bits, in this example sixteen bits, is then divided by eight in box 86 so as to calculate the number of output bytes that will eventually be used to form a compressed data signal to be sent to the output buffer. Provision is made to save any leftover output bits or pixels, but there will be none for this group of output pixels since all of them originated only from the bit mask array elements of the converted source color data which, as stated earlier in this disclosure, was always divisible by eight. The sixteen output pixels are then grouped into bytes of output data having eight bits each, as shown in box 88.

Compressing the Output Data

The next step is an attempt to compress the output data. This is accomplished by comparing the bytes of output data to each other to determine if they are of the same value as shown in decision box 90. If they are of the same value, a repeating run PCL Method Two compressed data output signal is constructed. In this particular instance the output bytes will be of differing values since they were derived from different dithering pattern matrices. As a result, in box 94, a literal run data output signal is constructed.

Sanding the Output Signal to the Output Buffer, Storing Output Signals in the Output Buffer, and Assembling Within the Output Buffer a Complete PCL Method Two Row Command The output signal is sent to the output buffer, where it is stored and will be used in the construction of a complete PCL Method Two raster row command as shown in box 96. Once the complete command has been constructed it is sent to the printer through output port 98. Since there are no remaining output pixels, no remainder from box 122 is sent to the first bit mask array element 201, box 56 in FIG. 2, and all the elements of both the gray scale value array 24 and the bit mask array 26 are reset to zero.

In practice, the use of the above-described conversion process using both gray scale value array 24, and the bit mask array 26 to scale output position bits without any repeating data, will typically result in a thirty percent time savings over the prior art.

In the case of repeating source data, even more significant time savings are achieved by use of the present invention. In these situations, the requirement to convert all the source color data for repeating pixels is eliminated, as is the requirement for dithering the output pixels associated with each repeating source pixel.

In the first conversion cycle the color data for two source pixels was converted which resulted in two elements of the bit mask array being used to construct a complete sixteen bit output position map. In the next conversion cycle of this example the next source pixel, the third one, begins a string of repeating pixels of the same color which extends across the raster line of the source image.

Converting the Color Data Information of a Source Pixel Into a Corresponding Gray Scale Value and Storing the Gray Scale Value in a Separate Element of the Gray Scale Value Array The conversion of source data into gray scale data cycle begins anew as shown in FIG. 4, with the next source pixel (namely the third pixel) becoming the first source pixel, which in box 52 of FIG. 2 is converted to a gray scale value, and in box 54 is entered into element 200 of gray scale value array 24 as shown in FIG. 4.

Generating and Storing Scaled Output Position Bits in the Bit Mask Array Element Indexed to the Gray Scale Array Element After entry of the gray scale value into element 200, scaled output position bits are entered into bit mask array element 201. The process is repeated with the next pixel, in this example source pixel number four, being converted to gray scale value in box 62 and tested in decision box 64 against the gray scale value entered in element 200, box 54. If the same value, which it will be if it has the same color data, then the appropriate number of scaled output position bits for source pixel four are also entered into bit mask array element 201, thus filling bit mask array element 201.

Testing to Determine Whether All of the Output Position Bits Are Stored in One Bit Mask Array Element The count in decision box 60 having determined that a full dither pattern width of output position bits are present, initiates a test, as shown in decision box 72, to determine whether all of the bits in the first bit mask array element are on, indicating that all of the output position bits are stored in that one bit mask array element. If so, all of the eventual output bits will of the same gray scale.

At this point in the process, instead of proceeding to dither the scaled output position bits, as was described in the first conversion cycle of this example, a check procedure is initiated to determine if the remaining unconverted source color data can be used to confirm whether or not additional pixels in the source row are the same color, and hence would be converted to the same gray scale value if the conversion process were to continue. By using the original source color data the need for conversion of each source pixel to a gray scale value is eliminated, thus saving considerable computing time. Additionally scaling operations and dithering, as will be explained later in this disclosure, are consolidated resulting in additional time savings.

The check procedure starts in decision box 100 with a test to determine whether a single byte of source image color data contains color information for more than one source pixel. If it does not, a 'No' decision in box 100, or if the source color information for each source pixel is contained in more than one byte, also a 'No' decision in box 100, than the byte values of the unconverted source color data for the next source pixels in the source row can be compared to the unconverted source color data for the last converted source pixel to determine if they are the same. If they are the same value, then the source pixels are the same color. The color data is compared byte for byte if the color data format is a single byte, or in the case of three byte or other multiple byte color data formats, then all multiple bytes are compared.

If the decision in box 100 is 'Yes' then each source byte of color data contains color information for more than one source pixel. If this occurs, a second test is made in decision box 102 to determine whether all pixels within the byte are the same color. This is done by comparing the color data values for each source pixel within the byte. If they are the same value, then the source pixels are the same color. If the decision is 'Yes', they are of the same color, then the process can proceed with a source byte comparison the same as in the case where this data is contained in one source byte.

If the decision in box 102 is 'No', the source pixels are of different color and conversion to gray scale value and dithering proceeds as previously set forth in box 74.

Comparing Unconverted Source Pixel Color Data Information for the Next Source Pixel Seriatim Once it has been determined that the dither pattern width of output position bits generated from conversion of source pixels are all the same gray scale value, and that unconverted color data can be compared, rather than directly proceeding with the dithering process, the source address and the source color value of the last source pixel converted are saved in save boxes 106 and 104 as shown in FIG. 2. Once saved, the process reads ahead in the source pixel row, testing each new source pixel color data value in decision box 108 to determine if it is the same as the saved source color value in save box 104.

Saving the Address of the Last Source Pixel Having Color Data Information of the Same Value as the Color Data Information of the Last Converted Source Pixel If the new source pixel color data value is the same, as the saved source color value, then the address of the source pixel tested in decision box 108 is saved in save box 110, which is continuously updated with the address of the last source pixel which tested 'same' in decision box 108. This process continues until the end of the source image row is reached as determined in decision box 112 or until a source pixel tests 'different' in decision box 108.

Once the test in decision box 108 indicates 'different' source color values or end of line is reached in decision box 112, then a test is made in decision box 114 to determine whether the address of the last converted source pixel saved in save box 106 is the same as the address of the source pixel for which the color data was last tested and saved in save box

110. If they are the same then there was no reading ahead in the source image row. If they are different then the process has read ahead in the source image row without conversion and dithering of each source pixel that is the same color as the source pixels originally converted in this cycle of operation.

Calculating the Number of Output Position Bits Would Generated from the Tested and Counted Source Pixels Having the Same Value of Color Data Information Next, in box 116, the process calculates the number of source pixels from the beginning of the source image row to the address of the last compared and saved source pixel in box 110. From the calculated number of source pixels, the total number of scaled output pixels that need to be generated in the scaling process from the beginning of the output monochrome bit map row to the same relative position in the destination image is calculated as shown in box 118. From this total, in box 120, the total number of output pixels generated from skipping ahead can be computed by subtracting the number of output pixels already sent to and stored in the output buffer.

It is necessary to compute the number of output pixels generated from the source pixels that were skipped by reading ahead in this manner because the scaling process may involve scaling of source pixels to output pixels in non integer ratios and as a result an extra output pixel will be added periodically whenever the accumulation of fractional output pixels total to a complete output pixel. Also, computing the number of output pixels in this manner eliminates any potential scaling problems in the initial conversion and scaling process at the beginning of the cycle where only a dither pattern width of output position bits are accumulated in the bit mask array before being tested in decision box 72 to determine if all of the output position bits are located in the bit mask array element and hence are of the same color. If they are not all in the same bit mask array element, then the dither pattern width of output position bits will be dithered seriatim and any carry over of additional scaled output bits from the last read source pixel will be re-entered in the next conversion cycle as the first source pixel gray scale value and output position bits If the test result in decision box 72 is 'yes', these same leftover output position bits are accounted for in the calculation of the total number of output bits needed to reach the same relative position in the output image as computed in box 118.

Dithering the Output Position Bits Stored in the Bit Mask Array Element to Generate Bits of Output Data After the total number of output bits of the same color has been determined, the gray scale value from gray scale value array element 200 is selected in box 74 and it, and the Y position in the output image dither pattern tile, are used to select the correct row of the correct dither pattern matrix as shown in box 76 in the same manner as in the dithering process for output pixels generated from first bit mask array element 201 in a cycle wherein there was no reading ahead. In a like manner the selected dither pattern row is rotated in box 80 so that the first dither matrix bit in the Y row corresponds to the same X position for the first output, position bit in bit mask array element 201 as it will be printed in the dither tile of the output image. Bit mask array element 201 is then ANDed in box 82 to the rotated row of the dither pattern matrix to generate actual output pixels.

Assembling an Output Signal from the Bits of Output Data to Form an Output Signal Next, bit mask array element 201 is ORed into a test array in box 84 to insure that a complete dither pattern tile width has been generated.

At this point the calculation of the number of output bytes is performed in box 86 by dividing the number of output bits from box 120, plus the dither pattern width from bit mask array element 201, by eight. Because of the reading ahead and scaling which has occurred, the number of eventual output bytes may be substantial and there will likely be a remainder of output bits insufficient to create a final full byte. This remainder is saved in save box 122, along with the gray scale value in box 54 for inclusion in the next cycle of conversion unless the end of the row has been reached, in which case a final partial output byte will be constructed.

The output position bits are then grouped into bytes of output signal having eight bits each, as shown in box 88.

Compressing the Output Data

The bytes of eight-bit output signal are compared to each other in box 90 to determine if they are the same or if they are different.

At this point in time the first complete dither pattern width of output bits has been divided into two repeating bytes of output data. It is also known, at this point, how many repeating bytes are required in the output string of data generated in this cycle. The dither pattern matrices that are used with the present invention are empirically determined, and wherever possible, each row of the matrix has a symmetrical pattern such that even if the row is rotated, when it is divided into output bytes, the bytes may likely be of equal value, such that the output can be constructed into repeating pairs of output bytes, or preferably into a repeating run PCL Method Two compressed data output signal as shown in box 92.

Sending the Output Signal to the Output Buffer, Storing Output Signals in the Output Buffer, and Assembling Within the Output Buffer a complete PCL Method Two Row Command Regardless of whether the data signal is constructed in box 92 or 94 it is sent to output buffer 96 where the signal is stored, and a complete PCL Method Two command for a destination image raster row is constructed for eventual transmission through output port 98 to the printer or other device.

Concurrent with transmission of the repeating run PCL Method 2 entry in box 92, in box 124 a command is sent to zero out the gray scale and bit mask arrays. The only exception is if there is a remainder in box 122, then the gray scale value for the remainder bits in save box 122 will be the same as that found in box 54, element 200, and therefore this element is not reset to zero. Instead, the remainder bits are rewritten as the fist output position bit entries in bit mask array element 201 as shown in box 56.

Repeating the Process to Generate a Number of Additional Rows of Monochrome Rasterized Bit Map Equal to the Y Scaling Factor Once a complete raster row of output image pixels has been assembled in the output buffer for transmission to the printer or other device, all of scaled pixels in the X direction will have been accounted for, but the scaling in the Y direction remains to be accomplished. For this reason, the same row of source image pixels will be reused in the process a number of times equal to the Y scaling factor to accomplish scaling in the Y direction, which in this example is eight rows with a periodic inclusion of a ninth row, when the accumulating scaling fractions total one additional row. The process is identical, but will not necessarily result in identical output raster rows since the Y position in the output image tiles will change, resulting in the selection of different rows within the dithering matrices, which may or may not contain different dither patterns.

While this example involved scaling up from lower resolution to higher resolution, exactly the same process can be used for scaling down from higher resolution to lower resolution. For example, scaling down from a 600 DPI rasterized source image to a video monochrome image. In such cases the scaling is revised, and only selected source image pixels are examined and included in the process. For example, if scaling were to occur from the 600 DPI rasterized source color image to a 300 DPI monochrome image, only every other source pixel would be converted in the conversion cycle, and/or read in the repeated data reading ahead cycle. In a like manner, this process can be used in situations where image clipping occurs, merely by modifying the identification of the beginning of each source line and the end of line tests. Similarly, it can be used for up or down sizing scaling. And finally, this process can be used to read and scale a monochrome source image.

While there is shown and described the present preferred embodiment of the invention, it is to be distinctly understood that this invention is not limited thereto but may be variously embodied to practice within the scope of the following claims.

APPENDIX A

```
/*******************************************************************
 *
 * Copyright (C) 1989,1990, 1991, 1992  Hewlett-Packard Company.
 *
 * DIBtoDev.C for raster objects
 *
 *
 *******************************************************************/

//#define DEBUG
#include "generic.h"
#include "utils.h"
#include "..\..\core\common.h"
#include "..\..\core\core.h"

int FAR PASCAL MulDiv(int, int, int);
int FAR PASCAL Control(LPDEVICE, short, LPSTR, LPPOINT);

typedef RGBQUAD FAR *LPRGBQUAD;
typedef RGBTRIPLE FAR *LPRGBTRIPLE;
typedef LPSTR LPBR;

#define RASTER_BANDING 0x0200
#define RGB_BLACK 0L
#define RGB_WHITE 0x00FFFFFF
#define ONE_PLANE    3

BOOL determine_bit(int, BYTE, int, int);
int Find_Lighter_Gray(BYTE);

int PASCAL HalfToneToDevice(
LPDEVICE   lpdv,        /* physical device */
LPCOMMONPDEV  lpCPDev,
WORD    DestX,  WORD DestY,
WORD    DestXE, WORD DestYE,
WORD    SrcX,   WORD SrcY,
WORD    SrcXE,  WORD SrcYE,
LPSTR   lpBits,         /* pointer to DIBitmap Bits */
LPBITMAPINFOHEADER lpBitmapInfoHeader,  /* DIBitmap info Block */
LPDRAWMODE lpdm,
LPRECT  lpClip
);

int FAR PASCAL Mono_StretchDIB(
LPDEVICE   lpdv,        /* physical device or mem bitmap */
LPCOMMONPDEV   lpCPDev,
WORD    wSetGetMode,
WORD    DestX,  WORD DestY,
WORD    DestXE, WORD DestYE,
WORD    SrcX,   WORD SrcY,
WORD    SrcXE,  WORD SrcYE,
LPSTR   lpBits,         /* pointer to DIBitmap Bits */
LPBITMAPINFOHEADER  lpBitmapInfoHeader,  /* pointer to DIBitmap info Block */
```

```
LPSTR    lpConversionInfo,  /* not used */
DWORD    dwRop,
LPBR     lpbr,
LPDRAWMODE lpdm,
LPRECT   lpClip
);

static VOID NEAR PASCAL send_PCLRow (
LPCOMMONPDEV           lpCPDev,
LPSTR                  lpSource,
WORD                   wRasterWidth
);

void fill_dither_matrix (LPCOMMONPDEV, LPSTR);

BYTE Linear_16x16_300_SX[DY_CLUSTER][DX_CLUSTER] = {
255, 249, 206,  31,   8,   1,  73, 164, 255, 249, 206,  31,   8,   1,  73, 164,
231, 239, 198,  39,  14,  23,  64, 173, 231, 239, 198,  39,  14,  23,  64, 173,
181, 189, 148,  98,  48,  56, 106, 139, 181, 189, 148,  98,  48,  56, 106, 139,
 94,  85, 119, 135, 227, 219, 160, 127,  94,  85, 119, 135, 227, 219, 160, 127,
  8,   1,  77, 169, 255, 249, 210,  35,   8,   1,  77, 169, 255, 249, 210,  35,
 19,  27,  69, 177, 235, 243, 202,  44,  19,  27,  69, 177, 235, 243, 202,  44,
 52,  60, 110, 144, 185, 194, 152, 102,  52,  60, 110, 144, 185, 194, 152, 102,
223, 214, 156, 123,  89,  81, 114, 131, 223, 214, 156, 123,  89,  81, 114, 131, 255, 249, 206,  31,   8,   1,  73, 164, 255, 249, 206,  31,   8,   1,  73, 164,
231, 239, 198,  39,  14,  23,  64, 173, 231, 239, 198,  39,  14,  23,  64, 173,
181, 189, 148,  98,  48,  56, 106, 139, 181, 189, 148,  98,  48,  56, 106, 139,
 94,  85, 119, 135, 227, 219, 160, 127,  94,  85, 119, 135, 227, 219, 160, 127,
  8,   1,  77, 169, 255, 249, 210,  35,   8,   1,  77, 169, 255, 249, 210,  35,
 19,  27,  69, 177, 235, 243, 202,  44,  19,  27,  69, 177, 235, 243, 202,  44,
 52,  60, 110, 144, 185, 194, 152, 102,  52,  60, 110, 144, 185, 194, 152, 102,
223, 214, 156, 123,  89,  81, 114, 131, 223, 214, 156, 123,  89,  81, 114, 131
};

int FAR PASCAL Mono_StretchDIB(
LPDEVICE   lpdv,      /* physical device */
LPCOMMONPDEV  lpCPDev,
WORD    wSetGetMode,
WORD    DestX, WORD DestY,
WORD    DestXE, WORD DestYE,
WORD    SrcX, WORD SrcY,
WORD    SrcXE, WORD SrcYE,
LPSTR   lpBits,       /* pointer to DIBitmap Bits */
LPBITMAPINFOHEADER lpBitmapInfoHeader,  /* pointer to DIBitmap info Block */
LPSTR   lpConversionInfo,  /* not used */
DWORD   dwRop,
LPBR    lpbr,
LPDRAWMODE lpdm,
LPRECT  lpClip
)
```

```
{
  int num;
#ifdef DEBUG_FUNCT
  DB(("Entering Mono_StretchDIB\n"));
endif if (!lpdv->epType)   // dest memory, GDI simulate
      return -1;
  lpdv->epMode |= ANYGRX;   // remember that we have graphics
  if (lpdv->epMode & DRAFTFLAG)
      return TRUE;   // draft mode
  if (TEXTBAND) {        // text band
      DBMSG(("In Mono_StretchDIB, TEXTBAND=TRUE, exiting\n"));
      return TRUE;
  } if (lpdv->epNband < 2 && (lpCPDev->nCaps2 & RASTER_BANDING)){  // BAND not valid
      return TRUE;
  }

// test for all cases that we want GDI to simulate if (wSetGetMode != 0 ||             // GET operation
      lpBitmapInfoHeader->biCompression != 0 ||   // RLE format
      //   lpBitmapInfoHeader->biBitCount == 1 ||   // 1 bit case
      (lpBitmapInfoHeader->biBitCount != 1 && lpdv->epScaleFac)
      || ((dwRop != SRCCOPY) && (dwRop != SRCPAINT)))
      return -1;

// Setting the source transparency to TRUE may cause Payette to have memory out problems,
// on the other hand, not setting it to TRUE will cause more driver ROP problems. Such is life.
      if ((lpdm->bkMode == OPAQUE) || (dwRop == SRCCOPY))
          SetPCLSrcOpaque(lpCPDev, TRUE);
      else
          SetPCLSrcOpaque(lpCPDev, FALSE);

// At this point, I don't care about the pattern because I don't have one. But this helps Payette
// not have as manay memory overflows.
      SetPCLPattOpaque(lpCPDev, FALSE);

// we probably want to text the destination rect with
  // the band rect to see if we really need to do this band lpdv->epMode |= GRXFLAG;

num = HalfToneToDevice(lpdv,
  lpCPDev,
  DestX, DestY,
  DestXE, DestYE,
  SrcX, SrcY,
  SrcXE, SrcYE,
  lpBits, lpBitmapInfoHeader,
  lpdm, lpClip);
```

```
#ifdef DEBUG_FUNCT
    DB(("Exiting Mono_StretchDIB\n"));
#endif
    return num;
} int FAR PASCAL Mono_DIBToDevice(
LPDEVICE   lpdv,         /* physical device */
LPCOMMONPDEV  lpCPDev,
WORD    DestX,       /* Destination X (on screen) */
WORD    DestY,       /* Destination Y (on screen) */
WORD    nStart,
WORD    nNumScans,   /* # of scan lines to do */
LPRECT  lpClip,
LPDRAWMODE lpdm,
LPSTR   lpBits,      /* pointer to DIBitmap Bits */
LPBITMAPINFOHEADER lpBitmapInfoHeader,  /* pointer to DIBitmap info Block */
LPSTR   lpConversionInfo  /* not used */
)
{
    DWORD realHeight;
    RECT rc;
    int res;
    WORD xScale, yScale;

xScale = (int)lpBitmapInfoHeader->biWidth;
    yScale = (int)lpBitmapInfoHeader->biHeight;

realHeight = lpBitmapInfoHeader->biHeight;
    lpBitmapInfoHeader->biHeight = nNumScans;   // patch up the height rc.left = DestX;
    rc.top = DestY + MulDiv(((int)realHeight - nStart - nNumScans),
                            yScale,
                            (WORD) realHeight);
    rc.right = rc.left + xScale;
    rc.bottom = rc.top + MulDiv(nNumScans, yScale, (int)realHeight);

res = Mono_StretchDIB(lpdv, lpCPDev, 0,
    rc.left, rc.top,
    xScale, MulDiv(nNumScans, yScale, (int)realHeight),
    0, 0, (WORD)lpBitmapInfoHeader->biWidth, nNumScans,
    lpBits, lpBitmapInfoHeader, lpConversionInfo, SRCCOPY, NULL, lpdm,
    lpClip);

lpBitmapInfoHeader->biHeight = realHeight;//restore patched height ifdef DEBUG_FUNCT
```

```
    DB(("Exiting Mono_DIBToDevice\n"));
#endif
    return res;
} void BuildGrayMap(LPBITMAPINFOHEADER lpBitmapInfoHeader, BYTE FAR *lpmap)
{
    int table_size;
    LPRGBQUAD lppal;

if (lpBitmapInfoHeader->biBitCount == 24)
        return;

table_size = (1 << lpBitmapInfoHeader->biBitCount);
    lppal = (LPRGBQUAD)((LPSTR)lpBitmapInfoHeader +
        lpBitmapInfoHeader->biSize);

while (table_size--) {
        *lpmap++ = INTENSITY(lppal->rgbRed,
        lppal->rgbGreen,
        lppal->rgbBlue);

lppal++;
    }
#ifdef DEBUG_FUNCT
    DB(("Exiting BuildGrayMAp\n"));
#endif
}

BYTE bit_index[] = {0x7F, 0xBF, 0xDF, 0xEF, 0xF7, 0xFB, 0xFD, 0xFE};

/*--------------- HALFTONETODEVICE ---------------*/ int PASCAL HalfToneToDevice (
LPDEVICE   lpdv ,
LPCOMMONPDEV   lpCPDev,
WORD   DestX , WORD  DestY ,
WORD   DestXE, WORD  DestYE,
WORD   SrcX , WORD  SrcY ,
WORD   SrcXE , WORD  SrcYE ,
LPSTR  lpBits,            // pointer to DIBitmap Bits
LPBITMAPINFOHEADER lpBitmapInfoHeader,  // pointer to DIBitmap info Block
LPDRAWMODE lpdm ,
LPRECT   lpClip
)
{
BYTE huge   *lpbits;                /* let the compiler do seg stuff */
BYTE huge   *lplinestart;
int     bit_count, Terryint;
int     scan_width;
RECT    dest_rect, clip_rect, white_rect, band_rect;
POINT   band_offset;
```

```
int         x_dst, y_dst;
BYTE FAR    *lp_dst_bits_start;
register BYTE FAR *lp_dst_bits;
unsigned int  bit_offset;
BYTE        gray_map[256], byte;         // NVF15NOV90
BYTE        use_low_nyble, start_low;
int         xscaledown, yscaledown;
unsigned long cxscale, cxsample, cyscale, cysample,
            dxscale, dxsample, dyscale, dysample;
unsigned short IsLastRow,x_last,xoffset;
    static BOOL kludge_flag = TRUE;
// Compression buffers... Objexts as raster code addidion - TS
HANDLE      hOutput2, hOutput3, hDither;
LPSTR       lpOutput2, lpOutput3;
WORD far *lpDither;
HANDLE      hDestBits, hTempSrc, hSeedRow;
LPSTR       lpDestBits, lpTempSrc, lpSeedRow;
int         RasterWidth, RasterHeight;

#define DITHERPATTERNWIDTH 16
#define DITHERPATTERNHEIGHT 16
BYTE byte_array [DITHERPATTERNWIDTH];
WORD temp_word, output_word, dither_pattern, mask_array [DITHERPATTERNWIDTH];
BYTE CompareByte = 0xFF;  // white
BOOL transition_byte = TRUE;
char FAR *M2_command_byte;
LPSTR M2_next_unused_byte;
LPSTR save_addr;
int M2_length;
int M2_repeat_count;
int counter, DIB_fract_byte, bit_position, sent_pixels;
unsigned long Out_pixel_counter;
int array_start;
int Source_counter;
BYTE output_byte, output_byte1, output_byte2, save_byte, save_byte2, save_byte3;
int done_flag;
int counter2;
unsigned int bit_mask = 0x8000;
BOOL M2_repeating;

//
// Check for scaling down NVF 26DEC90
// THE UNFORTUNATE DAY AFTER CHRISTMAS
//
    xscaledown = FALSE;
    yscaledown = FALSE;
    if (DestXE < SrcXE)
        xscaledown = TRUE;
    if (DestYE < SrcYE)
        yscaledown = TRUE;

//
// generate clippng rect based on band rect, dest rect and
```

```
// input clipping rect
//
    dest_rect.left   = DestX;
    dest_rect.top    = DestY;
    dest_rect.right  = DestX + DestXE;
    dest_rect.bottom = DestY + DestYE;

clip_rect = *lpClip;
//
// make sure things are non empty, and bail if there is no work to be
// done
//
    if (!IntersectRect(&clip_rect, &clip_rect, &dest_rect))
        return 0;

//
// offset these to account for band offset
//
    band_offset.xcoord = lpdv->epXOffset >> lpdv->epScaleFac;
    band_offset.ycoord = lpdv->cpYOffset >> lpdv->epScaleFac;

OffsetRect(&clip_rect, -band_offset.xcoord, -band_offset.ycoord);
    OffsetRect(&dest_rect, -band_offset.xcoord, -band_offset.ycoord);

white_rect = dest_rect;

IntersectRect(&white_rect, &clip_rect, &white_rect);

//
// Decide on the dither pattern to be used.
//

// allocate memory for compression buffers.
        hDither = (HANDLE)GlobalAlloc(GHND, 8192);
        if (hDither == NULL)
            return FALSE;
        lpDither = (LPSTR)GlobalLock ( (HANDLE)hDither );
        if ( lpDither == NULL )
        {
            GlobalFree ( (HANDLE)hDither );
            return FALSE;
        } fill_dither_matrix ( lpCPDev, lpDither );

//--------------- deal with the clipping ----------------
    clip_rect = white_rect;
//
```

```
// now clip_rect holds actuall area where we are going to
// output to. we need to translate this back into the
// DIB space, and setup initial error terms to account for
// scaling from the larger dest space to the smaller DIB
// space.
//
// transform the diff between the clip rect and the dest rect
// back into the DIB space to find the starting clipped pixel
// (this rounds down)
//
    SrcX += (WORD)ldiv(ldiv(lmul(lmul((long)(clip_rect.left - dest_rect.left),
            (long)100), (long)SrcXE), (long)DestXE), (long)100);
//
// same thing in Y
//
    SrcY += (WORD)ldiv(ldiv(lmul(lmul((long)(clip_rect.top-dest_rect.top),
            (long)100), (long)SrcYE), (long)DestYE), (long)100);

RasterWidth = clip_rect.right - clip_rect.left;
RasterHeight = clip_rect.bottom - clip_rect.top;

// allocate memory for compression buffers.
        hOutput2 = (HANDLE)GlobalAlloc(GHND, 2 * RasterWidth);
        if (hOutput2 == NULL)
                return FALSE;
        lpOutput2 = (LPSTR)GlobalLock ( (HANDLE)hOutput2 );
        if ( lpOutput2 == NULL )
        {
                GlobalFree ( (HANDLE)hOutput2 );
                return FALSE;
        }

//--------------- send PCL Escape sequences --------------
// TGS - switch into PCL mode (if nec.) and send start
//        sequences using new clip_rect.

// Position image on page, update CAP in CPDev if (lpdv->epNband > 2)
                SetPCLCAP(lpCPDev, clip_rect.left, clip_rect.top + lpdv->epBandDepth *
                    (lpdv->epNband - 2));
        else
                SetPCLCAP(lpCPDev, clip_rect.left, clip_rect.top);

// Issue a start raster graphics command at CAP (Esc*r#A)
        FillSpoolBuf(lpCPDev, (LPSTR) "\033*r1A", 5, PCL_MODE);

// Issue raster width PCL command
        FillSpoolBuf(lpCPDev, (LPSTR) "\033*r", 3, PCL_MODE);
        itoa ((int)RasterWidth, Coordinate);
        FillSpoolBuf (lpCPDev, (LPSTR)Coordinate, lstrlen(Coordinate), PCL_MODE);
        FillSpoolBuf(lpCPDev, (LPSTR) "S", 1, PCL_MODE);
```

```c
// Issue raster height PCL command
        FillSpoolBuf(lpCPDev, (LPSTR) "\033*r", 3, PCL_MODE);
        itoa ((int)RasterHeight, Coordinate);
        FillSpoolBuf (lpCPDev, (LPSTR)Coordinate, lstrlen(Coordinate), PCL_MODE);
        FillSpoolBuf(lpCPDev, (LPSTR) "T", 1, PCL_MODE);

// Issue compression method 2 command.
        FillSpoolBuf(lpCPDev, (LPSTR) "\033*b2M", 5, PCL_MODE);

//
//------------ get pointers to the DIB data ---------
// scan_width is the width of one scan line.
// DIB scanlines are on DWORD boundaries so this needs to be
// rounded up bit_count  = lpBitmapInfoHeader->biBitCount;
    scan_width = (((WORD)lpBitmapInfoHeader->biWidth * bit_count + 7)
            / 8 + 3) & 0xFFFC;
//
// offset to start scan
//
    lplinestart = (BYTE huge *)lpBits;
    lplinestart += lmul((long)scan_width,(long)(SrcYE - 1));
    lplinestart -= lmul((long)scan_width,(long)SrcY);

//
// and offset to starting pixel
// NOTE: this is upside down. we need to run through the dib
// backwards to flip it right side up
//
    switch (bit_count) {
      case 1:
          lplinestart += SrcX / 8;
          use_low_nyble = (BYTE) SrcX & 7;
          break;
      case 4:
          lplinestart += SrcX / 2;
          if ((BYTE)SrcX & 1)
              DIB_fract_byte = 0;
          else
              DIB_fract_byte = 1;
          break;
      case 8:
          lplinestart += SrcX;
          break;
      case 24:
          lplinestart += (WORD)MulDiv(SrcX, 3, 1);
          break;
    }

BuildGrayMap(lpBitmapInfoHeader, gray_map);
```

/************* BEGINNING OF THE SCALE CODE *************/

```
    if (clip_rect.top < 0)
        clip_rect.top = 0;   // NVF 23OCT90 added check for clip_rect < 0

//
// start at the bottom, and go up, flipping the DIB
//
    dyscale  = DestYE;
    dysample = SrcYE ;
    cyscale  = dyscale ;
    cysample = dysample;

// This for loop is the one that prints each destination bitmap line.
// y_dst serves as both a line counter and the grayscale tileing
// reference point for the pattern orgin.

//   for (y_dst  = clip_rect.bottom - 1;
//        y_dst >= clip_rect.top;
//        -y_dst , cysample += dysample)
//   {
    for (y_dst = clip_rect.top;
         y_dst < clip_rect.bottom;
         y_dst++ , cysample += dysample)
    {

/************ GOTO THE NEXT LINE TO PRINT ***************/ if (yscaledown) {
            while (cyscale < cysample) {
                    lplinestart -= scan_width;   // goto the next DIB line backward
                cyscale    += dyscale;
            }
        } else {
            if (cysample > cyscale) {
                    lplinestart -= scan_width;   // goto the next DIB line backward
                cyscale    += dyscale;
            }
        } lpbits = lplinestart;            // the current DIB line

//
// HORIZONTAL DIRECTION STUFF
//
        x_dst    = clip_rect.left;

dxscale  = DestXE ;
        cxscale  = dxscale ;
        dxsample = SrcXE  ;
        cxsample = dxsample;
```

```
//      switch (bit_count) {
//          case 1 : use_low_nyble = (BYTE)7 - start_low; break;
//          case 4 : use_low_nyble = start_low          ; break;
//      }
```

/**************** PRINT A ROW OF PIXELS ******************/
if 0

```
        if (y_dst < (clip_rect.top + ((SrcYE + (DestYE - 1))/DestYE)))
        {
          IsLastRow = 1;

xoffset = clip_rect.right;

switch (bit_count)
        {
          case 1:
            clip_rect.right -= ldiv(lmul(8L,cxscale) +
                    (cxsample - 1L),cxsample);

break;
          case 4:
            clip_rect.right -= ldiv(lmul(2L,cxscale) +
                    (cxsample - 1L),cxsample);

break;
          case 8:
            clip_rect.right -= ldiv(cxscale +
                    (cxsample - 1L),cxsample);
            break;
          case 24:
            clip_rect.right -= (WORD)MulDiv((ldiv(cxscale
                    + (cxsample - 1),cxsample) + 2),1,3);
            break;
        } xoffset -= clip_rect.right;
        }
        else
            IsLastRow = 0;
```
endif

```
M2_command_byte = lpOutput2;    // May not be needed.
M2_next_unused_byte= lpOutput2;
M2_next_unused_byte++;
M2_repeating = TRUE;
M2_length = 0;
counter2 = 0;
done_flag = 0;
array_start = 0;
sent_pixels = 0;
```

// START OF AN X ROW PROCESSING

// The code from here to the end of the program is not structured code
// for performance reasons. This code is very heavily exercised - it
// dithers and places every bit in a destination bitmap.

//*******************************************************************
//*
//*         1 Bit Per Pixel DIBs
//*
//*******************************************************************

```
if (bit_count == 1) {

// insure that the first pixel of the DIB is read
if (xscaledown){ // back up one bit.
   if (use_low_nyble)
      use_low_nyble--;
   else
      lpbits--;
} else {
    cxsample = 0; // Fixes the read off the end of the bitmap problem
    use_low_nyble = (7 - use_low_nyble);
}

// zero out the entire array
for (counter2 = 0; counter2 < DITHERPATTERNWIDTH; counter2++) {
     byte_array[counter2] = 0;
     mask_array[counter2] = 0;
} while (x_dst < clip_rect.right) {

Out_pixel_counter = 0;

// Loop to fill the output gray scale array.
for (bit_position = array_start; bit_position < DITHERPATTERNWIDTH; bit_position ++) { if (xscaledown) {  // Scale Down case.
         while (cxscale < cxsample) {
            if (!use_low_nyble) {
                 ++lpbits;
               use_low_nyble = 7;
            } else
              --use_low_nyble;
            cxscale += dxscale;
         } // end of cxscale < cxsample while loop
  } else { // scaleup
         if (!(cxsample < cxscale)) {
            if (!use_low_nyble) {
               ++lpbits;
               use_low_nyble = 7;
            } else
```

```
            --use_low_nyble;
          cxscale += dxscale;
        } // end of cxsample > cxscale if statement
} x_dst++; // count the destination pixels going into the array
  if (!(x_dst < clip_rect.right))   // PCL graphics width command takes care of the extra trash bits.
       break;

if (gray_map[(*lpbits >> use_low_nyble) & 1])
              byte = 0;
          else
              byte = 0xFF;

// Put the gray value into the array, use the bit mask to indicate pixel position.
  for (counter = 0; counter < DITHERPATTERNWIDTH; counter++) {
     if (byte == byte_array[counter]) { // new byte matched a color already saved
         mask_array[counter] |= (bit_mask >> bit_position);
         cxsample += dxsample;
         break;
     }
     else {
        if ((byte_array[counter] == 0) && (mask_array [counter] == 0))  { // new color
            mask_array[counter] = (bit_mask >> bit_position);
            byte_array[counter] = byte;
            cxsample += dxsample;
            break;
        }
     }
  }

} // end of the fill array loop
Out_pixel_counter = DITHERPATTERNWIDTH;
// Check for repeating input bytes. If the bytes repeat, the pixels must repeat.

if (mask_array[0] == 0xFFFF) { //solid color- due to scaling, only valid condition to skip ahead
   if ((*lpbits == 0xFF ) || (*lpbits == 0)) { // all pixels created by the byte are equal save_byte = *lpbits;
       save_addr = lpbits;

// may also change to linestare + (long)(clip_rect.right converted to bytes)
       while ((lpbits < lplinestart + (long)scan_width) && (save_byte == *lpbits)) {
            lpbits++;
       } if (save_addr < lpbits) { // We did skip ahead some bytes
              // Recalculate the scaling variables based on our new position.
              cxscale = lmul ((long)(((int)lpbits - (int)lplinestart) * (8 / bit_count)), dxscale);
              Out_pixel_counter = (int)(ldiv(cxscale, dxsample));
              cxsample = lmul ((long)(Out_pixel_counter ), dxsample);

x_dst = Out_pixel_counter + clip_rect.left;
```

```
        // We may have read to the end of the DIB line, beyond the clip rect.
        // get rid of this test by changing the while statement?? or leave it??
        // Which way is fastest? Which way is more robust?
        if ( x_dst > clip_rect.right)
                Out_pixel_counter = clip_rect.right - clip_rect.left - 1;

Out_pixel_counter -= sent_pixels;

// The values of cxscale & cxsample will cause the current byte to be used to correct for
        // normal scaling rounding stuff, then this forces the next source byte to be read.
        lpbits--;
        use_low_nyble = 0; // We are now aligned on a byte boundary

}

}
} // End of the check for repeating bytes.

// Convert the byte array contents into a dithered byte ready for output to printer.
// Just grab the mask for the white pixels - automatically inverts bits for PCL
if (byte_array[0])
    output_word = mask_array[0];
else
    output_word = mask_array[1];

//Here we make the mode 2 command with output_byte and repetition count

M2_repeat_count = Out_pixel_counter / 8;
sent_pixels += M2_repeat_count * 8;

output_byte1 = (BYTE)(output_word >> 8);
output_byte2 = (BYTE)(output_word & 0x00FF);

// Justification for the label and goto statement:
// The code that handles each DIB format is written in an "in line" style that is generally frowned
// upon by C programmers. Function calls have been avoided because performance really counts
// in this area of code. The "in line" style caught up with me and this label is needed.
// The variable array_start will be non zero only if we skipped ahead in the source DIB due to
// repeating bytes and the number of output pixels generated is not evenly divisible by the
// dither pattern width. When the output pixels get compressed, they are processed in 8 bit
// increments (the dither pattern width is evenly divisible by 8) and there can be bits left over.
// Normally, left over bits are recycled through the input arrays and everything works out fine, but
// at the end of the row, there may be bits left over that will not get recycled. This label and it's
// goto statement enable the last few bits (if any) in a row to be processed.

FINISH_DIB1_ROW:

if (!(output_byte1 - output_byte2)) { // easy case, compressable

//if ((!array_start) && (!xscaledown)) {    // repeat bytes due to severe scaling up
//       while (cxsample + (8 * dxsample) <= cxscale) {
```

```
//      x_dst += 8;
//      if (x_dst > clip_rect.right) {
//          x_dst -= 8;
//          break;
//      }
//      cxsample += 8 * dxsample;
//      M2_repeat_count ++;
//  } if (M2_repeat_count > 1)   { // repeating run
        if (M2_repeating == FALSE) {
            M2_command_byte = M2_next_unused_byte;
            M2_next_unused_byte ++;
        }
        M2_repeating = TRUE;
        while (M2_repeat_count > 128) {
            *M2_command_byte = (-127);
            *M2_next_unused_byte = output_byte1;
            M2_next_unused_byte+=2;
            M2_command_byte+=2;
            M2_repeat_count -= 128;
        } if (M2_repeat_count) {
            *M2_command_byte= ((int)(M2_repeat_count - 1) * -1);
            *M2_next_unused_byte = output_byte1;
            M2_next_unused_byte+=2;
            M2_command_byte+=2;
        }

M2_repeat_count = 0;
    }       // end of repeating runs if (M2_repeat_count)  {            // must be == 1 - this is a literal run.
        M2_repeating = FALSE;
        *M2_next_unused_byte++ = output_byte1;
        *M2_command_byte = (BYTE)M2_next_unused_byte - (BYTE)M2_command_byte - 2;
        if (*M2_command_byte == 0x7F) {
            M2_command_byte = M2_next_unused_byte;
            M2_next_unused_byte++;
            *M2_command_byte = 0;
        }
    }   // end of literal runs
}  // end of the compressable condition (both output bytes are equal)
else {  // output_byte1 not = output_byte2, not very compressable.
    while (TRUE) {
        if (!M2_repeat_count)
            break;
        M2_repeating = FALSE;
        *M2_next_unused_byte++ = output_byte1;
        *M2_command_byte = (BYTE)M2_next_unused_byte - (BYTE)M2_command_byte - 2;
        if (*M2_command_byte == 0x7F) {
```

```
                M2_command_byte = M2_next_unused_byte;
                M2_next_unused_byte++;
                *M2_command_byte = 0;
            }
            M2_repeat_count--;
            if (!M2_repeat_count)
                break;
            M2_repeating = FALSE;
            *M2_next_unused_byte++ = output_byte2;
            *M2_command_byte = (BYTE)M2_next_unused_byte - (BYTE)M2_command_byte - 2;
            if (*M2_command_byte == 0x7F) {
                M2_command_byte = M2_next_unused_byte;
                M2_next_unused_byte++;
                *M2_command_byte = 0;
            }
            M2_repeat_count--;
        } // end of while TRUE loop
    }       // end of non compressable repeating double bytes.

array_start = Out_pixel_counter % 8;

// Due to scaling, the number of output pixels processed may not be byte aligned,
    // and there may be bits left over.
    if (array_start) {
        mask_array[0] = 0;
        for (bit_position = 0; bit_position < array_start; bit_position++)
            mask_array[0] |= bit_mask >> bit_position;

}
    else {
        // zero out the entire array
        for (counter2 = 0; (counter2 < 8) && (!mask_array[counter2] == 0); counter2++) {
            byte_array[counter2] = 0;
            mask_array[counter2] = 0;
        }
    }

} // end of x_dst while statement.

// The row is compressed, send it to the printer.

if (array_start) {   // Process any left over pixels at the end of the row.
        output_byte = 0;
        M2_repeat_count = 1;
        // determine if output_byte1 or output_byte2 is next to go
        if (!((Out_pixel_counter / 8) % 2))
            output_byte1 = output_byte2;
        Out_pixel_counter = 0;
        // Only send the proper number of bits
        for (bit_position = 0; bit_position < array_start; bit_position++) {
```

```
                    output_byte |= output_byte1 & 0x80 >> bit_position;
                }
                output_byte1 = output_byte;
                goto FINISH_DIB1_ROW;
        } send_PCLRow(lpCPDev, lpOutput2 , (int)M2_next_unused_byte - (int)lpOutput2 );

// Due to Y direction scaling, there may be duplicate lines we can send now.
        while ((cyscale < cysample) && ( y_dst < clip_rect.bottom)) {
                y_dst++ ;
                cysample += dysample;
                send_PCLRow(lpCPDev, lpOutput2 , (int)M2_next_unused_byte - (int)lpOutput2 );
        }

} // end of bit count if statement.

//****************************************************************
//*
//*          4 Bit Per Pixel DIBs
//*
//**************************************************************** else if (bit_count == 4) {

// ****************************************************************
//* x_dst - represents progress through the destination bitmap .
//* Out_pixel_counter - pixels that are elegible to be sent to the printer
//* sent_pixels - pixels already in the output buffer
//****************************************************************

// insure that the first pixel of the DIB is read
if (xscaledown){
   if (DIB_fract_byte)
      lpbits--;
   else
      DIB_fract_byte = 0;
} else {
   cxsample = 0; // Fixes the read off the end of the bitmap problem
   DIB_fract_byte = 0;
   byte = gray_map[*lpbits >> 4];
}

// zero out the entire array
for (counter2 = 0; counter2 < DITHERPATTERNWIDTH; counter2++) {
      byte_array[counter2] = 0;
      mask_array[counter2] = 0;
}

//Read DIBs
```

```
while (x_dst < clip_rect.right) {

Out_pixel_counter = 0;

// Loop to fill the output gray scale array.
for (bit_position = array_start; bit_position < DITHERPATTERNWIDTH; bit_position++) {

// Read a source pixel
if (xscaledown) {   // Scale Down case.
    while (cxscale < cxsample) {
        if (DIB_fract_byte) {
            DIB_fract_byte = 0;
            lpbits++;
            byte = gray_map[*lpbits >> 4];
        } else {
            DIB_fract_byte = 1;
            byte = gray_map[*lpbits & 0x0F];
        }
        cxscale += dxscale;
    } // end of cxscale < cxsample while loop
} else { // scaleup
    if (!(cxsample < cxscale)) {
        if (DIB_fract_byte) {
            DIB_fract_byte = 0;
            lpbits++;
            byte = gray_map[*lpbits >> 4];
        } else {
            DIB_fract_byte = 1;
            byte = gray_map[*lpbits & 0x0F];
        }
        cxscale += dxscale;
    } // end of cxsample > cxscale if loop
} x_dst++; // count the destination pixels going into the array
if (!(x_dst < clip_rect.right))   // PCL graphics width command takes care of the extra trash bits.
    break;

// Put the gray value into the array, use the bit mask to indicate pixel position.
for (counter = 0; counter < DITHERPATTERNWIDTH; counter++) {
    if (byte == byte_array[counter]) { // new byte matched a color already saved
        mask_array[counter] |= (bit_mask >> bit_position);
        cxsample += dxsample;
        break;
    }
    else {
        if ((byte_array[counter] == 0) && (mask_array[counter] == 0)) { // new color
            mask_array[counter] = (bit_mask >> bit_position);
            byte_array[counter] = byte;
            cxsample += dxsample;
            break;
        }
    }
}
```

```
}
} // end of the fill array loop
Out_pixel_counter = DITHERPATTERNWIDTH;
// Check for repeating input bytes. If the bytes repeat, the pixels must repeat.

if (mask_array[0] == 0xFFFF) { //solid color- due to scaling, only valid condition to skip ahead
    if (!((*lpbits >> 4 )- (*lpbits & 0x0F))) { // all pixels created by the byte are equal save_byte = *lpbits;
        save_addr = lpbits;

// may also change to linestart + (long)(clip_rect.right converted to bytes)
        while ((lpbits < lplinestart + (long)scan_width) && (save_byte == *lpbits)) {
            lpbits ++;
        } if (save_addr < lpbits) { // We did skip ahead some bytes
            // Recalculate the scaling variables based on our new position.
            cxscale = lmul ((long)(((int)lpbits - (int)lplinestart) * (8 / bit_count)), dxscale);
            Out_pixel_counter = (int)(ldiv(cxscale, dxsample));
            cxsample = lmul ((long)(Out_pixel_counter ), dxsample);

x_dst = Out_pixel_counter + clip_rect.left;

// We may have read to the end of the DIB line, beyond the clip rect.
            // get rid of this test by changing the while statement?? or leave it??
            // Which way is fastest? Which way is more robust?
            if ( x_dst > clip_rect.right)
                Out_pixel_counter = clip_rect.right - clip_rect.left - 1;

Out_pixel_counter -= sent_pixels;

// The values of cxscale & cxsample will cause the current byte to be used to correct for
            // normal scaling rounding stuff, then this forces the next source byte to be read.
            lpbits--;
            DIB_fract_byte = 1;
        }

// If we have a lot of white space, do a dot move or suppress white output at end of line
// if ((byte_array[0] == 0xFF) && (mask_array[0] == 0xFFFF) && (Out_pixel_counter > big number))
//      if (!((x_dst + Out_pixel_counter) < clip_rect.right))
//          Out_pixel_counter = 0; // suppress the white at the end of the line.
//      else
//          do a dot move rather than a method 2 command.

}
} // End of the check for repeating bytes.

// Convert the byte array contents into a dithered byte ready for output to printer.
bit_offset = (sent_pixels + clip_rect.left) % DITHERPATTERNWIDTH;
```

```
for (counter2=0, done_flag = 0, output_word = 0; (counter2 < DITHERPATTERNWIDTH) &&
    (!(done_flag == 0xFFFF)); counter2++) {
    done_flag |= mask_array[counter2];
    // After debugging, combine the following lines into fewer operations
    // find unrotated dither pattern - Note Terryint is for debug use - remove when done.
    Terryint = (int)((byte_array[counter2] << 4) + (y_dst % DITHERPATTERNWIDTH));
    dither_pattern =(WORD)lpDither[Terryint];

//      dither_pattern =(WORD)lpDither[ (int)((byte_array[counter2] << 4) +
//                       (y_dst % DITHERPATTERNWIDTH))];
    // rotate it
    temp_word = dither_pattern << bit_offset;
    temp_word |= dither_pattern >> (DITHERPATTERNWIDTH - bit_offset);
    // apply the dither pattern to the applicable bits
    temp_word &= mask_array[counter2];
    // add it to the rest of the output byte
    output_word |= temp_word;
}

//Here we make the mode 2 command with output_byte and repetition count

M2_repeat_count = Out_pixel_counter / 8;
sent_pixels += M2_repeat_count * 8;

output_byte1 = (BYTE)(output_word >> 8);
output_byte2 = (BYTE)(output_word & 0x00FF);

// Justification for the label and goto statement:
// The code that handles each DIB format is written in an "in line" style that is generally frowned
// upon by C programmers. Function calls have been avoided because performance really counts
// in this area of code. The "in line" style caught up with me and this label is needed.
// The variable array_start will be non zero only if we skipped ahead in the source DIB due to
// repeating bytes and the number of output pixels generated is not evenly divisible by the
// dither pattern width. When the output pixels get compressed, they are processed in 8 bit
// increments (the dither pattern width is evenly divisible by 8) and there can be bits left over.
// Normally, left over bits are recycled through the input arrays and everything works out fine, but
// at the end of the row, there may be bits left over that will not get recycled. This label and it's
// goto statement enable the last few bits (if any) in a row to be processed.

FINISH_DIB4_ROW:

if (!(output_byte1 - output_byte2)) { // easy case, compressable

//if ((!array_start) && (!xscaledown)) {      // repeat bytes due to severe scaling up
//      while (cxsample + (8 * dxsample) <= cxscale) {
//          x_dst += 8;
//          if (x_dst > clip_rect.right) {
//              x_dst -= 8;
//              break;
//          }
//          cxsample += 8 * dxsample;
//          M2_repeat_count ++;
//      }
```

```
if (M2_repeat_count > 1)   { // repeating run
    if (M2_repeating == FALSE) {
        M2_command_byte = M2_next_unused_byte;
        M2_next_unused_byte++;
    }
    M2_repeating = TRUE;
    while (M2_repeat_count > 128) {
        *M2_command_byte = (-127);
        *M2_next_unused_byte = output_byte1;
        M2_next_unused_byte+=2;
        M2_command_byte+=2;
        M2_repeat_count -= 128;
    } if (M2_repeat_count) {
        *M2_command_byte= ((int)(M2_repeat_count - 1) * -1);
        *M2_next_unused_byte = output_byte1;
        M2_next_unused_byte+=2;
        M2_command_byte+=2;
    }

M2_repeat_count = 0;
}       // end of repeating runs if (M2_repeat_count)   {          // must be == 1 - this is a literal run.
    M2_repeating = FALSE;
    *M2_next_unused_byte++ = output_byte1;
    *M2_command_byte = (BYTE)M2_next_unused_byte - (BYTE)M2_command_byte - 2;
    if (*M2_command_byte == 0x7F) {
        M2_command_byte = M2_next_unused_byte;
        M2_next_unused_byte++;
        *M2_command_byte = 0;
    }
}       // end of literal runs
}  // end of the compressable condition (both output bytes are equal)
else {   // output_byte1 not = output_byte2, not very compressable.
while (TRUE) {
        if (!M2_repeat_count)
            break;
        M2_repeating = FALSE;
        *M2_next_unused_byte++ = output_byte1;
        *M2_command_byte = (BYTE)M2_next_unused_byte - (BYTE)M2_command_byte - 2;
        if (*M2_command_byte == 0x7F) {
            M2_command_byte = M2_next_unused_byte;
            M2_next_unused_byte++;
            *M2_command_byte = 0;
        }
        M2_repeat_count--;
        if (!M2_repeat_count)
            break;
        M2_repeating = FALSE;
```

```
                *M2_next_unused_byte++ = output_byte2;
                *M2_command_byte = (BYTE)M2_next_unused_byte - (BYTE)M2_command_byte - 2;
                if (*M2_command_byte == 0x7F) {
                    M2_command_byte = M2_next_unused_byte;
                    M2_next_unused_byte++;
                    *M2_command_byte = 0;
                }
                M2_repeat_count--;
        } // end of while TRUE loop
    }       // end of non compressable repeating double bytes.

array_start = Out_pixel_counter % 8;

// Due to scaling, the number of output pixels processed may not be byte aligned,
    // and there may be bits left over.
    if (array_start) {
            mask_array[0] = 0;
            for (bit_position = 0; bit_position < array_start; bit_position++)
                    mask_array[0] |= bit_mask >> bit_position;
    }
    else {
            // zero out the entire array
            for (counter2 = 0; (counter2 < DITHERPATTERNWIDTH) &&
                (!mask_array[counter2] == 0); counter2++) {
                    byte_array[counter2] = 0;
                    mask_array[counter2] = 0;
            }
    }

} // end of x_dst while statement.

// The row is compressed, send it to the printer.

if (array_start) {   // Process any left over pixels at the end of the row.
            output_byte = 0;
            M2_repeat_count = 1;
            // determine if output_byte1 or output_byte2 is next to go
            if (!((Out_pixel_counter / 8) % 2))
                output_byte1 = output_byte2;
            Out_pixel_counter = 0;
            // Only send the proper number of bits
            for (bit_position = 0; bit_position < array_start; bit_position++) {
                output_byte |= output_byte1 & 0x80 >> bit_position;
            }
            output_byte1 = output_byte;
            goto FINISH_DIB4_ROW;
        } send_PCLRow(lpCPDev, lpOutput2, (int)M2_next_unused_byte - (int)lpOutput2 );
```

} // end of bit count if statement

```
//*****************************************************
//*
//*      8 Bit Per Pixel DIBs
//*
//***************************************************** else if (bit_count == 8)    { // 8 bits per pixel

// insure that the first pixel of the DIB is read
if (xscaledown){
    lpbits--;
} else {
    cxsample = 0; // Fixes the read off the end of the bitmap problem
    byte = gray_map[*lpbits];
}

// zero out the entire array
for (counter2 = 0; counter2 < DITHERPATTERNWIDTH; counter2++) {
    byte_array[counter2] = 0;
    mask_array[counter2] = 0;
} while (x_dst < clip_rect.right) {

Out_pixel_counter = 0;

// Loop to fill the output gray scale array.
for (bit_position = array_start; bit_position < DITHERPATTERNWIDTH; bit_position++) {

// Read a source pixel
if (xscaledown) {   // Scale Down case.
   while (cxscale < cxsample) {
        lpbits++;
        byte = gray_map[*lpbits];
        cxscale += dxscale;
   } // end of cxscale < cxsample while loop
} else { // scaleup
    if (!(cxsample < cxscale)) {
        lpbits++;
        byte = gray_map[*lpbits];
        cxscale += dxscale;
    } // end of cxsample > cxscale if loop
}
```

```
x_dst++;  // count the destination pixels going into the array
if (!(x_dst < clip_rect.right))    // PCL graphics width command takes care of the extra trash bits.
    break;

// Put the gray value into the array, use the bit mask to indicate pixel position.
for (counter = 0; counter < DITHERPATTERNWIDTH; counter++) {
    if (byte == byte_array[counter]) { // new byte matched a color already saved
        mask_array[counter] |= (bit_mask >> bit_position);
        cxsample += dxsample;
        break;
    }
    else {
        if ((byte_array[counter] == 0) && (mask_array [counter] == 0)) { // new color
            mask_array[counter] = (bit_mask >> bit_position);
            byte_array[counter] = byte;
            cxsample += dxsample;
            break;
        }
    }
}

} // end of the fill array loop
Out_pixel_counter = DITHERPATTERNWIDTH;
// Check for repeating input bytes. If the bytes repeat, the pixels must repeat.

if (mask_array[0] == 0xFFFF) { //solid color- due to scaling, this is the only valid condition to skip ahead save_byte = *lpbits;
    save_addr = lpbits;

// may also change to linestare + (long)(clip_rect.right converted to bytes)
    while ((lpbits < lplinestart + (long)scan_width) && (save_byte == *lpbits)) {
        lpbits ++;
    } if (save_addr < lpbits) { // We did skip ahead some bytes
        // Recalculate the scaling variables based on our new position.
        cxscale = lmul ((long)(((int)lpbits - (int)lplinestart) * (8 / bit_count)), dxscale);
        Out_pixel_counter = (int)(ldiv(cxscale, dxsample));
        cxsample = lmul ((long)(Out_pixel_counter ), dxsample);

x_dst = Out_pixel_counter + clip_rect.left;

// We may have read to the end of the DIB line, beyond the clip rect.
        // get rid of this test by changing the while statement?? or leave it??
        // Which way is fastest? Which way is more robust?
        if ( x_dst > clip_rect.right)
            Out_pixel_counter = clip_rect.right - clip_rect.left - 1;

Out_pixel_counter -= sent_pixels;
```

```
            lpbits--;
        }

} // End of the check for repeating bytes.

// Convert the byte array contents into a dithered byte ready for output to printer.
    bit_offset = (sent_pixels + clip_rect.left) % DITHERPATTERNWIDTH;

for (counter2=0, done_flag = 0, output_word = 0; (counter2< DITHERPATTERNWIDTH) &&
        (!(done_flag == 0xFFFF)); counter2++) {
            done_flag |= mask_array[counter2];
            // After debugging, combine the following lines into fewer operations
            // find unrotated dither pattern
            dither_pattern = (WORD)lpDither[ (int)((byte_array[counter2] << 4) +
                            (y_dst % DITHERPATTERNWIDTH))];
            // rotate it
            temp_word = dither_pattern << bit_offset;
            temp_word |= dither_pattern >> (DITHERPATTERNWIDTH - bit_offset);
            // apply the dither pattern to the applicable bits
            temp_word &= mask_array[counter2];
            // add it to the rest of the output byte
            output_word |= temp_word;
    }

//Here we make the mode 2 command with output_byte and repetition count

M2_repeat_count = Out_pixel_counter / 8;
    sent_pixels += M2_repeat_count * 8;

output_byte1 = (BYTE)(output_word >> 8);
    output_byte2 = (BYTE)(output_word & 0x00FF);

// Justification for the label and goto statement:
    // The code that handles each DIB format is written in an "in line" style that is generally frowned
    // upon by C programmers. Function calls have been avoided because performance really counts
    // in this area of code. The "in line" style caught up with me and this label is needed.
    // The variable array_start will be non zero only if we skipped ahead in the source DIB due to
    // repeating bytes and the number of output pixels generated is not evenly divisible by the
    // dither pattern width. When the output pixels get compressed, they are processed in 8 bit
    // increments (the dither pattern width is evenly divisible by 8) and there can be bits left over.
    // Normally, left over bits are recycled through the input arrays and everything works out fine, but
    // at the end of the row, there may be bits left over that will not get recycled. This label and it's
    // goto statement enable the last few bits (if any) in a row to be processed.

FINISH_DIB8_ROW:

if (!(output_byte1 - output_byte2)) { // easy case, compressable if (M2_repeat_count > 1)   { // repeating run
            if (M2_repeating == FALSE) {
```

```
            M2_command_byte = M2_next_unused_byte;
            M2_next_unused_byte++;
        }
        M2_repeating = TRUE;
        while (M2_repeat_count > 128) {
            *M2_command_byte = (-127);
            *M2_next_unused_byte = output_byte1;
            M2_next_unused_byte+=2;
            M2_command_byte+=2;
            M2_repeat_count -= 128;
        } if (M2_repeat_count) {
            *M2_command_byte = ((int)(M2_repeat_count - 1) * -1);
            *M2_next_unused_byte = output_byte1;
            M2_next_unused_byte+=2;
            M2_command_byte+=2;
        }

M2_repeat_count = 0;
    }       // end of repeating runs if (M2_repeat_count) {              // must be == 1 - this is a literal run.
        M2_repeating = FALSE;
        *M2_next_unused_byte++ = output_byte1;
        *M2_command_byte = (BYTE)M2_next_unused_byte - (BYTE)M2_command_byte - 2;
        if (*M2_command_byte == 0x7F) {
            M2_command_byte = M2_next_unused_byte;
            M2_next_unused_byte++;
            *M2_command_byte = 0;
        }
    }       // end of literal runs
}  // end of the compressable condition (both output bytes are equal)
else {   // output_byte1 not = output_byte2, not very compressable.
while (TRUE) {
    if (!M2_repeat_count)
        break;
    M2_repeating = FALSE;
    *M2_next_unused_byte++ = output_byte1;
    *M2_command_byte = (BYTE)M2_next_unused_byte - (BYTE)M2_command_byte - 2;
    if (*M2_command_byte == 0x7F) {
        M2_command_byte = M2_next_unused_byte;
        M2_next_unused_byte++;
        *M2_command_byte = 0;
    }
    M2_repeat_count--;
    if (!M2_repeat_count)
        break;
    M2_repeating = FALSE;
    *M2_next_unused_byte++ = output_byte2;
    *M2_command_byte = (BYTE)M2_next_unused_byte - (BYTE)M2_command_byte - 2;
    if (*M2_command_byte == 0x7F) {
        M2_command_byte = M2_next_unused_byte;
```

```
                M2_next_unused_byte++;
                *M2_command_byte = 0;
            }
            M2_repeat_count--;
        } // end of while TRUE loop
    }       // end of non compressable repeating double bytes.

array_start = Out_pixel_counter % 8;

// Due to scaling, the number of output pixels processed may not be byte aligned,
    // and there may be bits left over.
    if (array_start) {
            mask_array[0] = 0;
            for (bit_position = 0; bit_position < array_start; bit_position++)
                    mask_array[0] |= bit_mask >> bit_position;
    }
    else {
            // zero out the entire array
            for (counter2 = 0; (counter2 < DITHERPATTERNWIDTH) &&
                (!mask_array[counter2] == 0); counter2++) {
                    byte_array[counter2] = 0;
                    mask_array[counter2] = 0;
            }
    }

} // end of x_dst while statement.

// The row is compressed, send it to the printer.

if (array_start) {  // Process any left over pixels at the end of the row.
        output_byte = 0;
        M2_repeat_count = 1;
        // determine if output_byte1 or output_byte2 is next to go
        if (!((Out_pixel_counter / 8) % 2))
            output_byte1 = output_byte2;
        Out_pixel_counter = 0;
        // Only send the proper number of bits
        for (bit_position = 0; bit_position < array_start; bit_position++) {
            output_byte |= output_byte1 & 0x80 >> bit_position;
        }
        output_byte1 = output_byte;
        goto FINISH_DIB8_ROW;
    } send_PCLRow(lpCPDev, lpOutput2, (int)M2_next_unused_byte - (int)lpOutput2 );

} // end of bit count if statement
```

```
//****************************************************
//*
//*        24 Bit Per Pixel DIBs
//*
//**************************************************** else if (bit_count == 24)  { // 24 bits per pixel

// insure that the first pixel of the DIB is read
    if (xscaledown){
        lpbits -= sizeof(RGBTRIPLE);
    } else {
        cxsample = 0; //Fixes the read off the end of the bitmap problem
        byte = INTENSITY(((LPRGBTRIPLE)lpbits)->rgbtRed,
            ((LPRGBTRIPLE)lpbits)->rgbtGreen,
            ((LPRGBTRIPLE)lpbits)->rgbtBlue);
    }

// zero out the entire array
    for (counter2 = 0; counter2 < DITHERPATTERNWIDTH; counter2++) {
        byte_array[counter2] = 0;
        mask_array[counter2] = 0;
    } while (x_dst < clip_rect.right) {

Out_pixel_counter = 0;

// Loop to fill the output gray scale array.
    for (bit_position = array_start; bit_position < DITHERPATTERNWIDTH; bit_position++) {

// Read a source pixel
        if (xscaledown) {    // Scale Down case.
            while (cxscale < cxsample) {
                lpbits += sizeof(RGBTRIPLE);
                byte = INTENSITY(((LPRGBTRIPLE)lpbits)->rgbtRed,
                    ((LPRGBTRIPLE)lpbits)->rgbtGreen,
                    ((LPRGBTRIPLE)lpbits)->rgbtBlue);
                cxscale += dxscale;
            } // end of cxscale < cxsample while loop
        } else { // scaleup
            if (!(cxsample < cxscale)) {
                lpbits += sizeof(RGBTRIPLE);
                byte = INTENSITY(((LPRGBTRIPLE)lpbits)->rgbtRed,
                    ((LPRGBTRIPLE)lpbits)->rgbtGreen,
                    ((LPRGBTRIPLE)lpbits)->rgbtBlue);
                cxscale += dxscale;
```

```
        }   // end of cxsample > cxscale if loop
} x_dst++; // count the destination pixels going into the array
    if (!(x_dst < clip_rect.right))    // PCL graphics width command takes care of the extra trash bits.
        break;

// Put the gray value into the array, use the bit mask to indicate pixel position.
for (counter = 0; counter < DITHERPATTERNWIDTH; counter++) {
    if (byte == byte_array[counter]) {   // new byte matched a color already saved
        mask_array[counter] |= (bit_mask >> bit_position);
        cxsample += dxsample;
        break;
    }
    else {
        if ((byte_array[counter] == 0) && (mask_array [counter] == 0)) {  // new color
            mask_array[counter] = (bit_mask >> bit_position);
            byte_array[counter] = byte;
            cxsample += dxsample;
            break;
        }
    }
}

}  // end of the fill array loop
Out_pixel_counter = DITHERPATTERNWIDTH;
// Check for repeating input bytes. If the bytes repeat, the pixels must repeat.

if (mask_array[0] == 0xFFFF) {  //solid color- due to scaling, only valid condition to skip ahead save_byte  = *lpbits;
        save_byte2 = *(lpbits + 1);
        save_byte3 = *(lpbits + 2);

save_addr = lpbits;

// may also change to linestare + (long)(clip_rect.right converted to bytes)
        while ((lpbits < lplinestart + (long)scan_width) && (save_byte == *lpbits) &&
               (save_byte2 == *(lpbits + 1)) && (save_byte3 == *(lpbits + 2))) {
            lpbits += sizeof(RGBTRIPLE);
        } if (save_addr < lpbits) {   // We did skip ahead some bytes

// Recalculate the scaling variables based on our new position.
                cxscale = lmul ((long)(((int)lpbits - (int)lplinestart) / (bit_count / 8)), dxscale);
                Out_pixel_counter = (int)(ldiv(cxscale, dxsample));
                cxsample = lmul ((long)(Out_pixel_counter ), dxsample);

x_dst = Out_pixel_counter + clip_rect.left;

// We may have read to the end of the DIB line, beyond the clip rect.
                // get rid of this test by changing the while statement?? or leave it??
```

```c
        // Which way is fastest? Which way is more robust?
        if ( x_dst > clip_rect.right)
                Out_pixel_counter = clip_rect.right - clip_rect.left - 1;

Out_pixel_counter -= sent_pixels;

lpbits -= sizeof(RGBTRIPLE);
    }

} // End of the check for repeating bytes.

// Convert the byte array contents into a dithered byte ready for output to printer.
bit_offset = (sent_pixels + clip_rect.left) % DITHERPATTERNWIDTH;

for (counter2=0, done_flag = 0, output_word = 0; (counter2 < DITHERPATTERNWIDTH) &&
    (!(done_flag == 0xFFFF)); counter2++) {
        done_flag |= mask_array[counter2];
        // After debugging, combine the following lines into fewer operations
        // find unrotated dither pattern
        dither_pattern =(WORD)lpDither[ (int)((byte_array[counter2] << 4) +
                        (y_dst % DITHERPATTERNWIDTH))];
        // rotate it
        temp_word = dither_pattern << bit_offset;
        temp_word |= dither_pattern >> (DITHERPATTERNWIDTH - bit_offset);
        // apply the dither pattern to the applicable bits
        temp_word &= mask_array[counter2];
        // add it to the rest of the output byte
        output_word |= temp_word;
}

//Here we make the mode 2 command with output_byte and repetition count

M2_repeat_count = Out_pixel_counter / 8;
sent_pixels += M2_repeat_count * 8;

// Justification for the label and goto statement:
// The code that handles each DIB format is written in an "in line" style that is generally frowned
// upon by C programmers. Function calls have been avoided because performance really counts
// in this area of code. The "in line" style caught up with me and this label is needed.
// The variable array_start will be non zero only if we skipped ahead in the source DIB due to
// repeating bytes and the number of output pixels generated is not evenly divisible by the
// dither pattern width. When the output pixels get compressed, they are processed in 8 bit
// increments (the dither pattern width is evenly divisible by 8) and there can be bits left over.
// Normally, left over bits are recycled through the input arrays and everything works out fine, but
// at the end of the row, there may be bits left over that will not get recycled. This label and it's
// goto statement enable the last few bits (if any) in a row to be processed.

FINISH_DIB24_ROW:

output_byte1 = (BYTE)(output_word >> 8);
output_byte2 = (BYTE)(output_word & 0x00FF);

if (!(output_byte1 - output_byte2)) { // easy case, compressable
```

```
//if ((!array_start) && (!xscaledown)) {      // repeat bytes due to severe scaling up
//      while (cxsample + (8 * dxsample) <= cxscale) {
//          x_dst += 8;
//          if (x_dst > clip_rect.right) {
//              x_dst -= 8;
//              break;
//          }
//          cxsample += 8 * dxsample;
//          M2_repeat_count++;
//      } if (M2_repeat_count > 1)   { // repeating run
        if (M2_repeating == FALSE) {
            M2_command_byte = M2_next_unused_byte;
            M2_next_unused_byte++;
        }
        M2_repeating = TRUE;
        while (M2_repeat_count > 128) {
            *M2_command_byte = (-127);
            *M2_next_unused_byte = output_byte1;
            M2_next_unused_byte+=2;
            M2_command_byte+=2;
            M2_repeat_count -= 128;
        } if (M2_repeat_count) {
            *M2_command_byte = ((int)(M2_repeat_count - 1) * -1);
            *M2_next_unused_byte = output_byte1;
            M2_next_unused_byte+=2;
            M2_command_byte+=2;
        }

M2_repeat_count = 0;
    }       // end of repeating runs if (M2_repeat_count)   {          // must be == 1 - this is a literal run.
        M2_repeating = FALSE;
        *M2_next_unused_byte++ = output_byte1;
        *M2_command_byte = (BYTE)M2_next_unused_byte - (BYTE)M2_command_byte - 2;
        if (*M2_command_byte == 0x7F) {
            M2_command_byte = M2_next_unused_byte;
            M2_next_unused_byte++;
            *M2_command_byte = 0;
        }
    }       // end of literal runs
}   // end of the compressable condition (both output bytes are equal)
else {   // output_byte1 not = output_byte2, not very compressable.
    while (TRUE) {
        if (!M2_repeat_count)
            break;
        M2_repeating = FALSE;
```

```
        *M2_next_unused_byte++ = output_byte1;
        *M2_command_byte = (BYTE)M2_next_unused_byte - (BYTE)M2_command_byte - 2;
        if (*M2_command_byte == 0x7F) {
                M2_command_byte = M2_next_unused_byte;
                M2_next_unused_byte++;
                *M2_command_byte = 0;
        }
        M2_repeat_count--;
        if (!M2_repeat_count)
                break;
        M2_repeating = FALSE;
        *M2_next_unused_byte++ = output_byte2;
        *M2_command_byte = (BYTE)M2_next_unused_byte - (BYTE)M2_command_byte - 2;
        if (*M2_command_byte == 0x7F) {
                M2_command_byte = M2_next_unused_byte;
                M2_next_unused_byte++;
                *M2_command_byte = 0;
        }
        M2_repeat_count--;
   } // end of while TRUE loop
}       // end of non compressable repeating double bytes.

array_start = Out_pixel_counter % 8;

// Due to scaling, the number of output pixels processed may not be byte aligned,
// and there may be bits left over.
if (array_start) {
        mask_array[0] = 0;
        for (bit_position = 0; bit_position < array_start; bit_position++)
                mask_array[0] |= bit_mask >> bit_position;

}
else {
        // zero out the entire array
        for (counter2 = 0; (counter2 < DITHERPATTERNWIDTH) &&
             (!mask_array[counter2] == 0); counter2++) {
                byte_array[counter2] = 0;
                mask_array[counter2] = 0;
        }
}

} // end of x_dst while statement.

// The row is compressed, send it to the printer.

if (array_start) {   // Process any left over pixels at the end of the row.
                output_byte = 0;
                M2_repeat_count = 1;
                // determine if output_byte1 or output_byte2 is next to go
                if (!((Out_pixel_counter / 8) % 2))
```

```
            output_byte1 = output_byte2;
        Out_pixel_counter = 0;
        // Only send the proper number of bits
        for (bit_position = 0; bit_position < array_start; bit_position++) {
            output_byte |= output_byte1 & 0x80 >> bit_position;
        }
        output_byte1 = output_byte;
        goto FINISH_DIB24_ROW;
    } send_PCLRow(lpCPDev, lpOutput2 , (int)M2_next_unused_byte - (int)lpOutput2 );

} // end of bit count if statement

// END OF X ROW PROCESSING bit_offset = clip_rect.left % 8;
    }

QUIT:

// Unlock compression buffers. Objects as raster code addition TS
    GlobalUnlock ( (HANDLE) hOutput2 );
    GlobalFree ( (HANDLE) hOutput2 );
    GlobalUnlock ( (HANDLE) hDither );
    GlobalFree ( (HANDLE) hDither );

// Update the CAP coordinates in the common PDev structure.
//      lpCPDev->wCAPXCoord = lpPoints->x;
        lpCPDev->wCAPYCoord += DestYE;

// Issue an end raster graphics.
        FillSpoolBuf(lpCPDev, (LPSTR) "\033*rB", 4, PCL_MODE);

#ifdef DEBUG_FUNCT
    DB(("Exiting HalfToneToDevicen"));
#endif
    return SrcYE;
} static VOID NEAR PASCAL send_PCLRow (lpCPDev, lpSource, wRasterWidth)
LPCOMMONPDEV    lpCPDev;
LPSTR           lpSource;
WORD            wRasterWidth;
{
        extern char Coordinate [25];

FillSpoolBuf(lpCPDev, (LPSTR) "\033*b", 3, PCL_MODE); // RED
        itoa ((int)wRasterWidth, Coordinate);
```

```
        FillSpoolBuf (lpCPDev, (LPSTR) Coordinate, lstrlen (Coordinate),
                PCL_MODE);

FillSpoolBuf(lpCPDev, (LPSTR) "W", 1, PCL_MODE);

FillSpoolBuf(lpCPDev, lpSource, wRasterWidth, PCL_MODE);
} // send_PCLRow void fill_dither_matrix (
LPCOMMONPDEV    lpCPDev,
WORD far *lp_dither_bits // word pointer to the dither matrix.
)
{ unsigned int    bit_offset = 0;
int             x_dst, y_dst;
BYTE byte, tbyte;
BYTE *(dither[DY_CLUSTER][DX_CLUSTER]);
LPSTR lpbits;
int counter1;

//BYTE bit_index[] = {0x7F, 0xBF, 0xDF, 0xEF, 0xF7, 0xFB, 0xFD, 0xFE};
WORD bit_index[] = {0x7FFF, 0xBFFF, 0xDFFF, 0xEFFF, 0xF7FF, 0xFBFF, 0xFDFF, 0xFEFF,
                    0xFF7F, 0xFFBF, 0xFFDF, 0xFFEF, 0xFFF7, 0xFFFB, 0xFFFD, 0xFFFE};

BYTE Linear_16x16_300_SX[DY_CLUSTER][DX_CLUSTER] = {
255, 249, 206, 31,  8,  1, 73, 164, 255, 249, 206, 31,  8,  1, 73, 164,
231, 239, 198, 39, 14, 23, 64, 173, 231, 239, 198, 39, 14, 23, 64, 173,
181, 189, 148, 98, 48, 56,106, 139, 181, 189, 148, 98, 48, 56,106, 139,
 94,  85, 119,135,227,219,160, 127,  94,  85, 119,135,227,219,160, 127,
  8,   1,  77,169,255,249,210,  35,   8,   1,  77,169,255,249,210,  35,
 19,  27,  69,177,235,243,202,  44,  19,  27,  69,177,235,243,202,  44,
 52,  60, 110,144,185,194,152, 102,  52,  60, 110,144,185,194,152, 102,
223, 214, 156,123, 89, 81,114, 131, 223, 214, 156,123, 89, 81,114, 131, 255, 249, 206, 31,  8,  1, 73, 164, 255, 249, 206, 31,  8,  1, 73, 164,
231, 239, 198, 39, 14, 23, 64, 173, 231, 239, 198, 39, 14, 23, 64, 173,
181, 189, 148, 98, 48, 56,106, 139, 181, 189, 148, 98, 48, 56,106, 139,
 94,  85, 119,135,227,219,160, 127,  94,  85, 119,135,227,219,160, 127,
  8,   1,  77,169,255,249,210,  35,   8,   1,  77,169,255,249,210,  35,
 19,  27,  69,177,235,243,202,  44,  19,  27,  69,177,235,243,202,  44,
 52,  60, 110,144,185,194,152, 102,  52,  60, 110,144,185,194,152, 102,
223, 214, 156,123, 89, 81,114, 131, 223, 214, 156,123, 89, 81,114, 131
};

/*----------------------------------------------------------
   16 x 16 alternately growing 4 dots at 45 degrees
   Payette Compensated threshholds; requires offset of 8 pixels
*/
```

BYTE Comp_16x16_300_P180[DY_CLUSTER][DX_CLUSTER] = {
126,145,136, 93, 86, 58, 53, 79, 124,143,133, 91, 84, 57, 51, 76,
167,252,236,109, 19, 5, 9, 46, 164,248,232,107, 18, 4, 8, 45,
178,254,220,118, 25, 0, 15, 41, 175,254,217,116, 23, 0, 13, 39,
155,205,192,101, 72, 30, 35, 65, 153,201,189, 99, 70, 28, 34, 64,
82, 54, 48, 73,120,138,128, 87, 81, 55, 50, 75,122,141,130, 89,
17, 2, 6, 42,159,240,224,103, 16, 3, 7, 43,162,244,228,105,
22, 0, 11, 37,170,254,208,111, 20, 0, 12, 38,173,254,212,114,
68, 26, 31, 60,148,195,181, 95, 67, 27, 32, 61,150,198,186, 97, 124,143,133, 91, 84, 57, 51, 76, 126,145,136, 93, 86, 58, 53, 79,
164,248,232,107, 18, 4, 8, 45, 167,252,236,109, 19, 5, 9, 46,
175,254,217,116, 23, 0, 13, 39, 178,254,220,118, 25, 0, 15, 41,
153,201,189, 99, 70, 28, 34, 64, 155,205,192,101, 72, 30, 35, 65,
81, 55, 50, 75,122,141,130, 89, 82, 54, 48, 73,120,138,128, 87,
16, 3, 7, 43,162,244,228,105, 17, 2, 6, 42,159,240,224,103,
20, 0, 12, 38,173,254,212,114, 22, 0, 11, 37,170,254,208,111,
67, 27, 32, 61,150,198,186, 97, 68, 26, 31, 60,148,195,181, 95
};

/*─────────────────────────────────────────────
  16 x 16 alternately growing 4 dots at 45 degrees
  Linear threshholds; requires offset of 8 pixels.
*/

BYTE Linear_16x16_600[DY_CLUSTER][DX_CLUSTER] = {
169,186,178,135, 93, 76, 85,118, 167,184,175,133, 91, 74, 83,116,
203,252,244,152, 60, 9, 17,110, 201,250,242,150, 57, 7, 15,108,
211,254,236,161, 51, 0, 26,102, 209,254,234,159, 49, 0, 24,100,
194,228,220,144, 68, 34, 43,127, 192,226,218,142, 66, 32, 41,125,
87, 70, 79,112,163,180,171,129, 89, 72, 81,114,165,182,173,131,
53, 3, 11,104,197,246,238,146, 55, 5, 13,106,199,248,240,148,
45, 0, 19, 95,205,254,230,154, 47, 0, 22, 97,207,254,232,157,
62, 28, 36,121,188,222,213,138, 64, 30, 38,123,190,224,216,140, 167,184,175,133, 91, 74, 83,116, 169,186,178,135, 93, 76, 85,118,
201,250,242,150, 57, 7, 15,108, 203,252,244,152, 60, 9, 17,110,
209,254,234,159, 49, 0, 24,100, 211,254,236,161, 51, 0, 26,102,
192,226,218,142, 66, 32, 41,125, 194,228,220,144, 68, 34, 43,127,
89, 72, 81,114,165,182,173,131, 87, 70, 79,112,163,180,171,129,
55, 5, 13,106,199,248,240,148, 53, 3, 11,104,197,246,238,146,
47, 0, 22, 97,207,254,232,157, 45, 0, 19, 95,205,254,230,154,
64, 30, 38,123,190,224,216,140, 62, 28, 36,121,188,222,213,138
};

/*─────────────────────────────────────────────
  16 x 16 alternately growing 4 dots at 45 degrees
  Payette Compensated threshholds; requires offset of 8 pixels
*/

BYTE Comp_16x16_600[DY_CLUSTER][DX_CLUSTER] = {

101,121,111, 65, 35, 25, 29, 51, 98,119,108, 63, 33, 25, 28, 49,
144,251,229, 82, 19, 1, 3, 45, 141,245,223, 80, 18, 1, 3, 43,
155,254,207, 91, 15, 0, 7, 39, 152,254,202, 88, 15, 0, 6, 38,
131,185,167, 74, 22, 9, 12, 57, 128,180,165, 72, 22, 9, 12, 56,
30, 23, 26, 46, 93,114,103, 59, 31, 24, 27, 48, 96,116,105, 61,
16, 0, 2, 40,135,234,212, 76, 17, 0, 2, 42,138,240,218, 78,
13, 0, 4, 37,146,254,191, 84, 14, 0, 5, 37,149,254,196, 87,
20, 8, 10, 53,123,170,158, 68, 21, 8, 11, 54,126,174,162, 70, 98,119,108, 63, 33, 25, 28, 49, 101,121,111, 65, 35, 25, 29, 51,
141,245,223, 80, 18, 1, 3, 43, 144,251,229, 82, 19, 1, 3, 45,
152,254,202, 88, 15, 0, 6, 38, 155,254,207, 91, 15, 0, 7, 39,
128,180,165, 72, 22, 9, 12, 56, 131,185,167, 74, 22, 9, 12, 57,
31, 24, 27, 48, 96,116,105, 61, 30, 23, 26, 46, 93,114,103, 59,
17, 0, 2, 42,138,240,218, 78, 16, 0, 2, 40,135,234,212, 76,
14, 0, 5, 37,149,254,196, 87, 13, 0, 4, 37,146,254,191, 84,
21, 8, 11, 54,126,174,162, 70, 20, 8, 10, 53,123,170,158, 68
};

```
char bit_patterns_16 [128] =
{ 0x00, 0x00, 0x00, 0x00, 0x00, 0x00, 0x00, 0x00, // black
  0x00, 0x02, 0x00, 0x00, 0x00, 0x20, 0x00, 0x00,
  0x00, 0x45, 0x00, 0xAA, 0x00, 0xA8, 0x00, 0x55,
  0x88, 0x44, 0x11, 0x22, 0x88, 0x44, 0x11, 0x22,
  0x00, 0x77, 0x00, 0xDD, 0x00, 0x77, 0x00, 0xDD,
  0x00, 0xFF, 0x00, 0xFF, 0x00, 0xFF, 0x00, 0xFF,
  0x88, 0xFF, 0x00, 0xFF, 0x22, 0xFF, 0x00, 0xFF,
  0x55, 0x77, 0x55, 0xDD, 0x55, 0x77, 0x55, 0xDD,
  0x2A, 0xFF, 0xA2, 0xFF, 0x8A, 0xFF, 0xA8, 0xFF,
  0xAA, 0xFF, 0xAA, 0xFF, 0xAA, 0xFF, 0xAA, 0xFF,
  0xF9, 0x3F, 0xE7, 0xFC, 0x9F, 0xF3, 0x7E, 0xCF,
  0xEF, 0xFD, 0xAF, 0x77, 0xFE, 0xDF, 0xFA, 0x77,
  0xEF, 0xFD, 0xBF, 0xF7, 0xFE, 0xDF, 0xFB, 0x7F,
  0xBF, 0xDF, 0xFB, 0xFD, 0xBF, 0xDF, 0xFB, 0xFD,
  0xBF, 0xFF, 0xFB, 0xFF, 0xBF, 0xFF, 0xFB, 0xFF,
  0xFF, 0xFF, 0xDF, 0xFF, 0xFF, 0xFF, 0xFD, 0xFF }; // lt gray char bit_patterns_32 [256] =
{ 0x00, 0x00, 0x00, 0x00, 0x00, 0x00, 0x00, 0x00, // black
  0x00, 0x02, 0x00, 0x00, 0x00, 0x20, 0x00, 0x00,
  0x00, 0x40, 0x00, 0x04, 0x00, 0x40, 0x00, 0x04,
  0x00, 0x8A, 0x00, 0x54, 0x00, 0x8A, 0x00, 0x54,
  0x00, 0x6D, 0x00, 0x55, 0x00, 0xD6, 0x00, 0xAA,
  0x00, 0x6D, 0x00, 0x77, 0x00, 0xD6, 0x00, 0xDD,
  0x00, 0x6D, 0x00, 0xDD, 0x00, 0x6B, 0x00, 0xDD,
  0x00, 0x77, 0x00, 0xDD, 0x00, 0x77, 0x00, 0xDD,
  0x33, 0x8C, 0x33, 0xC8, 0x33, 0x8C, 0x33, 0xC8,
  0x00, 0x6F, 0x00, 0xFF, 0x00, 0xF6, 0x00, 0xFF,
  0x00, 0xFF, 0x00, 0xFF, 0x00, 0xFF, 0x00, 0xFF,
  0x80, 0xFF, 0x00, 0xFF, 0x08, 0xFF, 0x00, 0xFF,
  0x88, 0xFF, 0x00, 0xFF, 0x22, 0xFF, 0x00, 0xFF,
```

```
0x88, 0xFF, 0x10, 0xFF, 0x22, 0xFF, 0x01, 0xFF,
0x55, 0x77, 0x55, 0xDD, 0x55, 0x77, 0x55, 0xDD,
0x2A, 0xFF, 0xA2, 0xFF, 0x8A, 0xFF, 0xA8, 0xFF,
0xCB, 0xF9, 0x2F, 0xE5, 0xBC, 0x9F, 0xF2, 0x5E,
0x2A, 0xFF, 0xA2, 0xFF, 0x8A, 0xFF, 0xA8, 0xFF,
0x2A, 0xFF, 0xAA, 0xFF, 0xA2, 0xFF, 0xAA, 0xFF,
0xBB, 0x77, 0xDD, 0xEE, 0xBB, 0x77, 0xDD, 0xEE,
0xAA, 0xFF, 0xAA, 0xFF, 0xAA, 0xFF, 0xAA, 0xFF,
0xF3, 0x7E, 0xCB, 0xF9, 0x3F, 0xE7, 0x6C, 0x9F,
0xF9, 0x3F, 0xE7, 0xFC, 0x9F, 0xF3, 0x7E, 0xCF,
0xF9, 0x3F, 0xF7, 0xFC, 0x9F, 0xF3, 0x7F, 0xCF,
0xEF, 0xFD, 0xAF, 0x77, 0xFE, 0xDF, 0xFA, 0x77,
0xEF, 0xFD, 0xBF, 0xE7, 0xFE, 0xDF, 0xFB, 0x7E,
0xEF, 0xFD, 0xBF, 0xF7, 0xFE, 0xDF, 0xFB, 0x7F,
0xBF, 0xDF, 0xFB, 0xFD, 0xBF, 0xDF, 0xFB, 0xFD,
0xF7, 0xFF, 0x7F, 0xBF, 0xFD, 0xFF, 0xDF, 0xFE,
0xBF, 0xFF, 0xFB, 0xFF, 0xBF, 0xFF, 0xFB, 0xFF,
0xFF, 0xEF, 0xDF, 0xFF, 0xFF, 0xFE, 0xFD, 0xFF,
0xFF, 0xFF, 0xDF, 0xFF, 0xFF, 0xFF, 0xFD, 0xFF};// light gray // Make dither pattern memory all 0xFFFF.
lpbits = lp_dither_bits;
for (y_dst = 0; y_dst < 8192; y_dst++)
{
    *lpbits = 0xFF;
    lpbits++;
}

// Fill in actual dither matrix values
for (counter1 = 0, byte = 0; counter1 < 256; counter1++, byte++) {
    for (y_dst = 0; y_dst < 16; y_dst++) {
        for (x_dst = 0; x_dst < 16; x_dst++) { if (lpCPDev->nPrinterRes == 600) {
                if (lpCPDev->ubDrvDither == SCANJETD) {
                    tbyte = Comp_16x16_600[y_dst][x_dst];
                    if (byte > tbyte)
                        *lp_dither_bits &= bit_index[bit_offset];
                } else {  // Normal 600 DPI dither
                    tbyte = Linear_16x16_600[y_dst][x_dst];
                    if (byte > tbyte)
                        *lp_dither_bits &= bit_index[bit_offset];
                }
            } else {  // Start of 300 DPI stuff
                if (lpCPDev->ubDrvDither == LINEARTD) {
                    if (byte == 0xFF) // white
                        *lp_dither_bits &= bit_index[bit_offset];
                    else if (byte == 0x00); // black
                    else if ((bit_patterns_32 [(int)(byte & 0xF8)
                            + (y_dst & 0x07)]) & (0x80u >> (x_dst & 0x07)))
                        *lp_dither_bits &= bit_index[bit_offset];
                }
            }
}
```

```
        else if (lpCPDev->ubDrvDither == SCANJETD) {
                tbyte = Comp_16x16_300_P180[y_dst][x_dst];
                if (byte > tbyte)
                    *lp_dither_bits &= bit_index[bit_offset];
        }
        else {  // Normal 300 dither
                tbyte = Linear_16x16_300_SX[y_dst][x_dst];
                if (byte > tbyte)
                    *lp_dither_bits &= bit_index[bit_offset];
        }
    } // end of 300 DPI stuff.

/*------- update bit offsets in dest. bitmap -------*/
    bit_offset++;
    if (bit_offset == 16) {
        bit_offset = 0;
        lp_dither_bits++;
    }

} // x_dst 0 to 16
    } // y_dst 0 to 16
} // byte 0 to 255

} // end of function fill_dither_matrix
```

What is claimed is:

1. In a peripheral unit that converts source pixel color image data to rows of a monochrome rasterized bit map, said peripheral unit including random access memory, a processor, an output buffer and a control memory containing a gray scale value conversion table, a plurality of dithering matrices, procedures for determining the location of an output pixel within an output image dither tile for the monochrome rasterized bit map, scaling conversion procedures for generating factored, scaled, output position bits in both an X and a Y direction, and data compression procedures, a method for converting source color image data to rows of a monochrome rasterized bit map which comprises:

a. establishing in the random access memory an array of elements for storing gray scale values;

b. establishing in the random access memory an array of bit mask elements, each having a bit block for storing output position bits, each of said elements being indexed to a corresponding gray scale value element, and each being sized to hold a plurality of output position bits equal to the number of bits in a row of an output image dither pattern tile;

c. converting the color data information of a source pixel into a corresponding gray scale value;

d. storing each different gray scale value obtained from conversion of said color data information in a separate element of the gray scale value array;

e. generating scaled output position bits for the converted source pixel;

f. storing said output position bits in the bit mask array element indexed to the gray scale array element for the source pixel from which the output position bits were generated, said output position bits being stored within the bit mask array element in positions bearing the same relation to each other as the positions of the source pixels have with respect to each other in the source pixel color image data.

g. repeating steps (c) through (f), until the number of source pixels converted has generated a plurality of output position bits equal in number to the width of an output image dither pattern tile;

h. testing to determine whether all of the output position bits are stored in one bit mask array element;

i. if the test indicates all of the output position bits are stored in one bit mask array element, then comparing unconverted source pixel color data information for the next source pixel, seriatim, to the unconverted color data information for the last converted source pixel until either the end of the source row is encountered or until color data information of unequal value is encountered, and counting the number of source pixel data compared;

j. saving the address of the last source pixel having color data information of the same value as the color data information of the last converted source pixel;

k. calculating the number of output position bits that would be generated from the compared and counted source pixels having the same value of color data information;

l. dithering the output position bits stored in the bit mask array element to generate bits of output data;

m. if the test result indicates that output position bits are stored in more than one bit mask array element, then sequentially dithering the output position bits stored in each element of the bit mask array holding stored output position bits to generate bits of output data;

n. assembling an output signal from the bits of output data to form bytes of output signal;

o. compressing the output data and the calculated number of output position bits from step (k) into a compressed data output signal;

p. sending the output signal to the output buffer;

q. storing output signals in the output buffer;

r. assembling, within the output buffer, a row of a monochrome rasterized bit map from the output signals stored in the output buffer; and s. repeating steps (c) through (r) to generate a number of additional rows of monochrome rasterized bit map equal to the Y scaling factor.

2. The method as recited in claim 1 wherein the number of bits in the bit block of each bit mask array element is evenly divisible by eight.

3. The method as recited in claim 1 wherein step (k) further comprises:

k(1) calculating the number of source pixels from the beginning of the source row to the last compared source pixel having color data information of equal value to the last converted source pixel;

k(2) calculating the number of scaled output position bits to be generated from the beginning of the monochrome bit map row for the number of source pixels calculated in step (k)(1);

k(3) subtracting from the number calculated in step (k)(2) the number of output pixels for the row already sent to and stored in the output buffer.

4. The method as recited in claim 1 wherein step (i) further comprises:

i(1) testing to determine whether a byte of source image color data contains color information for more than one source pixel;

i(2) if the test conducted in step (i)(1) indicates that color data is present in each source image color data byte for more than one source pixel, then testing the color data values for each source pixel contained within each byte to determine whether they are equal;

i(3) if the test conducted in step (i)(2) indicates that the color data values for each source pixel contained within a byte of source image color data are the same, then comparing the color data value contained within a byte of source image color data for the next source pixel, seriatim, to the color data value contained within a byte of source image color data for the previous source pixel until either the end of the source row is encountered or until an unequal color data value is encountered;

i(4) if the test conducted in step (i)(2) indicates that the color data for each source pixel contained within a byte of source image color data are different, then skip steps (j) and (k);

i(5) if the test conducted in step (i)(1) indicates that the color data is not present for more than one source pixel contained within each byte of source image color data, then comparing the color data value contained within a byte of source image color data for the next source pixel, seriatim, to the color data value contained within a byte of source image color data for the previous source pixel until either the end of the source row is encountered or until an unequal color data value is encountered.

5. The method as recited in claim 2 wherein step (k) further comprises:

k(1) calculating the number of source pixels from the beginning of the source row to the last compared source pixel having color data information of equal value to the last converted source pixel;

k(2) calculating the number of scaled output position bits to be generated from the beginning of the monochrome bit map row for the number of source pixels calculated in step k(1);

k(3) subtracting from the number calculated in step k(2) the number of output pixels for the row already sent to and stored in the output buffer.

6. The method as recited in claim 1 wherein step (l) further comprises:

l(1) calculating the Y position within the dither pattern tile for the output position bit in the first position within the filled bit mask array element;

l(2) selecting the Y row within the dither pattern matrix corresponding to the calculated Y position within the dither pattern tile;

l(3) calculating the X position within the dither pattern tile for the output position bit in the first position within the filled bit mask array element;

l(4) using the gray scale value stored in the element of the gray scale value array corresponding to the element of the bit mask array filled with output position bits, selecting a dither pattern matrix;

l(5) rotating the selected Y row of the dither pattern matrix to match the X position of the output position bit in the first position of the dithering matrix to the X position of the first output bit in the dither pattern tile;

l(6) ANDing the output position bits of the bit mask array element to the rotated dither pattern matrix row to generate bits of output data.

7. The method as recited in claim 1 wherein step o further comprises:

o(1) comparing the output signal bytes generated in step n to determine if they are the same or if they are different;

o(2) if the comparison conducted in step o(1) indicated that the output signal bytes are different, then constructing a literal run output data signal using the bytes of output signal generated in step n;

o(3) if the comparison conducted in step o(1) indicated that the output signal bytes are the same, then constructing a repeating run compressed data output signal.

8. The method as recited in claim 1 wherein step (m) further comprises:

m(1) calculating the Y position within the dither pattern tile for the output position bit in the first position within the filled bit mask array element;

m(2) selecting the Y row within the dither pattern matrix corresponding to the calculated Y position within the dither pattern tile;

m(3) calculating the X position within the dither pattern tile for the output position bit in the first position within the filled bit mask array element;

m(4) using the gray scale value stored in the element of the gray scale value array corresponding to the element of the bit mask array filled with output position bits, selecting a dither pattern matrix;

m(5) rotating the selected Y row of the dither pattern matrix to match the X position of the output position bit in the first position of the dithering matrix to the X position of the first output bit in the dither pattern tile;

m(6) ANDing the output position bits of the bit mask array element to the rotated dither pattern matrix row to generate bits of output data.

9. The method as recited in claim 1 wherein step (n) further comprises:

n(1) ORing the bits of output data generated in steps (l) and (m)into a test array to generate an assemblage of output data bits;

n(2) dividing the assemblage of output data bits by eight to calculate the number of output bytes;

n(3) saving any remainder output position bits from the division in step n(2);

n(4) grouping the output data bits into bytes of output signal having eight bits each.

n(5) rewriting the first element of the bit mask array to include a number of output position bits equal to the remainder output position bits saved in step n(3).

10. The method as recited in claim 2 wherein step (l) further comprises:

l(1) calculating the Y position within the dither pattern tile for the output position bit in the first position within the filled bit mask array element;

l(2) selecting the Y row within the dither pattern matrix corresponding to the calculated Y position within the dither pattern tile;

l(3) calculating the X position within the dither pattern tile for the output position bit in the first position within the filled bit mask array element;

l(4) using the gray scale value stored in the element corresponding to the element of the bit mask array filled with output position bits, selecting a dither pattern matrix;

l(5) rotating the selected Y row of the dither pattern matrix to match the X position of the output position bit in the first position of the dithering matrix to the X position of the first output bit in the dither pattern tile;

l(6) ANDing the output position bits of the bit mask array element to the rotated dither pattern matrix row to generate bits of output data.

11. The method as recited in claim 2 wherein step (o) further comprises:

o(1) comparing the output signal bytes generated in step n to determine if they are the same or if they are different;

o(2) if the comparison conducted in step o(1) indicated that the output signal bytes are different, then constructing a literal run output data signal using the bytes of output signal generated in step n;

o(3) if the comparison conducted in step o(1) indicated that the output signal bytes are the same, then constructing a repeating run compressed data output signal.

12. The method as recited in claim 2 wherein step (m) further comprises:

m(1) calculating the Y position within the dither pattern tile for the output position bit in the first position within the filled bit mask array element;

m(2) selecting the Y row within the dither pattern matrix corresponding to the calculated Y position within the dither pattern tile;

m(3) calculating the X position within the dither pattern tile for the output position bit in the first position within the filled bit mask array element;

m(4) using the gray scale value stored in the element corresponding to the element of the bit mask array filled with output position bits, selecting a dither pattern matrix;

m(5) rotating the selected Y row of the dither pattern matrix to match the X position of the output position bit in the first position of the dithering matrix to the X position of the first output bit in the dither pattern tile;

m(6) ANDing the output position bits of the bit mask array element to the rotated dither pattern matrix row to generate bits of output data.

13. The method as recited in claim 2 wherein step (n) further comprises:

n(1) ORing the bits of output data generated in steps (l) and (m) into a test array to generate an assemblage of output data bits;

n(2) dividing the assemblage of output data bits by eight to calculate the number of output bytes;

n(3) saving any remainder output position bits from the division in step n(2);

n(4) grouping the output data bits into bytes of output signal having eight bits each.

n(5) rewriting the first element of the bit mask array to include a number of output position bits equal to the remainder output position bits saved in step n(3).

14. The method as recited in claim 5 wherein step (l) further comprises:

l(1) calculating the Y position within the dither pattern tile for the output position bit in the first position within the filled bit mask array element;

l(2) selecting the Y row within the dither pattern matrix corresponding to the calculated Y position within the dither pattern tile;

l(3) calculating the X position within the dither pattern tile for the output position bit in the first position within the filled bit mask array element;

l(4) using the gray scale value stored in the element corresponding to the element of the bit mask array filled with output position bits, selecting a dither pattern matrix;

l(5) rotating the selected Y row of the dither pattern matrix to match the X position of the output position bit in the first position of the dithering matrix to the X position of the first output bit in the dither pattern tile;

l(6) ANDing the output position bits of the bit mask array element to the rotated dither pattern matrix row to generate bits of output data.

15. The method as recited in claim 14 wherein step (o) further comprises:

o(1) comparing the output signal bytes generated in step n to determine if they are the same or if they are different;

o(2) if the comparison conducted in step o(1) indicated that the output signal bytes are different, then constructing a literal run output data signal using the bytes of output signal generated in step n;

o(3) if the comparison conducted in step o(1) indicated that the output signal bytes are the same, then constructing a repeating run compressed data output signal.

16. The method as recited in claim 15 wherein step (m) further comprises:

m(1) calculating the Y position within the dither pattern tile for the output position bit in the first position within the filled bit mask array element;

m(2) selecting the Y row within the dither pattern matrix corresponding to the calculated Y position within the dither pattern tile;

m(3) calculating the X position within the dither pattern tile for the output position bit in the first position within the filled bit mask array element;

m(4) using the gray scale value stored in the element corresponding to the element of the bit mask array filled with output position bits, selecting a dither pattern matrix;

m(5) rotating the selected Y row of the dither pattern matrix to match the X position of the output position bit in the first position of the dithering matrix to the X position of the first output bit in the dither pattern tile;

m(6) ANDing the output position bits of the bit mask array element to the rotated dither pattern matrix row to generate bits of output data.

17. The method as recited in claim 16 wherein step (n) further comprises:

n(1) ORing the bits of output data generated in steps (l) and (m) into a test array to generate an assemblage of output data bits;

n(2) dividing the assemblage of output data bits by eight to calculate the number of output bytes;

n(3) saving any remainder output position bits from the division in step n(2);

n(4) grouping the output data bits into bytes of output signal having eight bits each.

n(5) rewriting the first element of the bit mask array to include a number of output position bits equal to the remainder output position bits saved in step n(3).

18. The method as recited in claim 17 wherein step (i) further comprises:

i(1) testing to determine whether a byte of source image color data contains color information for more than one source pixel;

i(2) if the test conducted in step (i)(1) indicates that color data is present in each source image color data byte for more than one source pixel, then testing the color data values for each source pixel contained within each byte to determine whether they are equal;

i(3) if the test conducted in step (i)(2) indicates that the color data values for each source pixel contained within a byte of source image color data are the same, then comparing the color data value contained within a byte of source image color data for the next source pixel, seriatim, to the color data value contained within a byte of source image color data for the previous source pixel until either the end of the source row is encountered or until an unequal color data value is encountered;

i(4) if the test conducted in step (i)(2) indicates that the color data for each source pixel contained within a byte of source image color data are different, then skip steps (j) and (k);

i(5) if the test conducted in step (i)(1) indicates that the color data is not present for more than one source pixel contained within each byte of source image color data, then comparing the color data value contained within a byte of source image color data for the next source pixel, seriatim, to the color data value contained within a byte of source image color data for the previous source pixel until either the end of the source row is encountered or until an unequal color data value is encountered.

* * * * *